US008684682B2

(12) United States Patent
Akashi et al.

(10) Patent No.: US 8,684,682 B2
(45) Date of Patent: Apr. 1, 2014

(54) POWER GENERATING APPARATUS OF RENEWABLE ENERGY TYPE

(75) Inventors: Yu Akashi, Tokyo (JP); Takeshi Matsuo, Tokyo (JP); Shinsuke Sato, Tokyo (JP); Takuro Kameda, Tokyo (JP); Yoshiyuki Morii, Tokyo (JP); Fumio Hamano, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 13/363,166

(22) Filed: Jan. 31, 2012

(65) Prior Publication Data
US 2012/0257970 A1    Oct. 11, 2012

Related U.S. Application Data

(63) Continuation of application No. PCT/JP2011/071673, filed on Sep. 22, 2011.

(30) Foreign Application Priority Data

Apr. 5, 2011 (WO) .................. PCT/JP2011/058647
Aug. 10, 2011 (WO) .................. PCT/JP2011/068284

(51) Int. Cl.
*F03D 11/00* (2006.01)
(52) U.S. Cl.
USPC ....................................... 415/178; 416/170 R
(58) Field of Classification Search
USPC .................... 415/178; 416/170 R; 290/44, 55
See application file for complete search history.

(56) References Cited

U.S. PATENT DOCUMENTS

| 2,539,862 | A | * | 1/1951 | Rushing ........................ 62/230 |
| 2,701,146 | A |   | 2/1955 | Warren |
| 2,706,255 | A |   | 4/1955 | Breaux et al. |
| RE24,179 | E | * | 7/1956 | Breaux et al. ................. 290/4 R |
| 3,030,118 | A |   | 4/1962 | Groce |

(Continued)

FOREIGN PATENT DOCUMENTS

| DE | 2138376 A1 | 2/1973 |
| DE | 202004016460 U1 | 1/2005 |

(Continued)

OTHER PUBLICATIONS

Written Opinion for PCT/JP2011/071673, mailed Nov. 11, 2011.

(Continued)

*Primary Examiner* — Ninh H Nguyen
(74) *Attorney, Agent, or Firm* — Kanesaka Berner & Partners, LLP

(57) ABSTRACT

A power generating apparatus of renewable energy type includes a tower, a nacelle which is supported rotatably by a tip portion of the tower; a main shaft rotatable with a blade; a hydraulic pump which is housed in the nacelle and is driven by rotation of the main shaft; a hydraulic motor which is driven by operating oil supplied from the hydraulic pump; a generator which is coupled to the hydraulic motor; an operating-oil line which is provided between the hydraulic pump and the hydraulic motor and through which the operating oil circulates; a cooling-medium line through which cooling medium for cooling the operating oil circulates via an intermediate heat exchanger; and a main heat exchanger which cools the cooling medium by heat exchange with cool water source around a base portion of the tower, and one of the operating-oil line.

18 Claims, 13 Drawing Sheets

(56) References Cited

U.S. PATENT DOCUMENTS

| | | | |
|---|---|---|---|
| 3,547,556 A | 12/1970 | Keene | |
| 3,943,717 A | 3/1976 | Schexnayder | |
| 4,503,673 A * | 3/1985 | Schachle et al. | 60/398 |
| 5,183,101 A | 2/1993 | Penaluna et al. | |
| 7,183,664 B2 | 2/2007 | McClintic | |
| 7,436,086 B2 | 10/2008 | McClintic | |
| 7,485,979 B1 * | 2/2009 | Staalesen | 290/44 |
| 7,569,943 B2 | 8/2009 | Kovach et al. | |
| 7,656,055 B2 | 2/2010 | Torres et al. | |
| 7,863,767 B2 | 1/2011 | Chapple et al. | |
| 8,109,814 B2 | 2/2012 | Uchino et al. | |
| 2005/0019166 A1 | 1/2005 | Bervang | |
| 2005/0174735 A1 | 8/2005 | Mankaruse et al. | |
| 2006/0117745 A1 | 6/2006 | Suzuki et al. | |
| 2007/0002538 A1 | 1/2007 | Tomioka | |
| 2007/0024058 A1 | 2/2007 | McClintic | |
| 2008/0216301 A1 | 9/2008 | Hansen et al. | |
| 2009/0025219 A1 | 1/2009 | Hansen et al. | |
| 2009/0129953 A1 | 5/2009 | Andersen | |
| 2009/0140522 A1 | 6/2009 | Chapple et al. | |
| 2010/0018055 A1 | 1/2010 | Lynderup et al. | |
| 2010/0028152 A1 | 2/2010 | Numajiri et al. | |
| 2010/0032959 A1 | 2/2010 | Nies | |
| 2010/0040470 A1 | 2/2010 | Nies et al. | |
| 2010/0066088 A1 | 3/2010 | Matsushita | |
| 2010/0127502 A1 | 5/2010 | Uchino et al. | |
| 2010/0139062 A1 | 6/2010 | Reed et al. | |
| 2011/0012365 A1 | 1/2011 | Becker | |
| 2011/0109094 A1 * | 5/2011 | Kenway et al. | 290/55 |
| 2011/0142596 A1 | 6/2011 | Nies | |

FOREIGN PATENT DOCUMENTS

| | | | |
|---|---|---|---|
| DE | 202007004342 U1 | 8/2008 | |
| EP | 0959287 A2 | 11/1999 | |
| EP | 1555441 A1 | 7/2005 | |
| EP | 1798414 A1 | 6/2007 | |
| EP | 2007184 A2 | 6/2007 | |
| EP | 2007184 A2 | 12/2008 | |
| EP | 2154368 A2 | 2/2010 | |
| GB | 2463647 | 3/2010 | |
| JP | 58047181 A | 3/1983 | |
| JP | 59-028136 Y2 | 8/1984 | |
| JP | 61212674 A | 9/1986 | |
| JP | 62-20678 | 1/1987 | |
| JP | 2004293455 A | 10/2004 | |
| JP | 2005248738 A | 9/2005 | |
| JP | 2006152862 A | 6/2006 | |
| JP | 2009503339 A | 1/2009 | |
| JP | 2009513882 A | 4/2009 | |
| JP | 2009118666 A | 5/2009 | |
| JP | 2009138555 A | 6/2009 | |
| JP | 2010031722 A | 2/2010 | |
| NL | 8101401 A | 10/1982 | |
| WO | 2007053036 A1 | 5/2007 | |
| WO | 2009000306 A1 | 12/2008 | |
| WO | 2009025420 A1 | 2/2009 | |
| WO | 2009-064192 A1 | 5/2009 | |
| WO | 2009058022 A1 | 5/2009 | |
| WO | 2009061209 A1 | 5/2009 | |
| WO | 2009076757 A2 | 6/2009 | |
| WO | 2009128708 A2 | 10/2009 | |
| WO | 2010033035 A1 | 3/2010 | |
| WO | 2010070450 A2 | 6/2010 | |
| WO | 2010115135 A1 | 10/2010 | |
| WO | 2010/125568 | 11/2010 | |

OTHER PUBLICATIONS

International Search Report with a mailing date of Aug. 11, 2011.
European Search Report dated Jun. 13, 2013.
International Search Report dated Nov. 1, 2011 issued in PCT/JP2011/071673.
Notice of Allowance dated Feb. 16, 2012 issued in JP 2011-554017.
International Search Report dated Jul. 19, 2011 issued in PCT/JP2011/058647.
Office Action dated Mar. 19, 2012 issued in U.S. Appl. No. 13/161,822.
Notice of Allowance dated Oct. 9, 2012 issued in U.S. Appl. No. 13/161,822.
European Search Report dated Jun. 13, 2013 issued in European Patent Application EP 11797295.0.
International Search Report dated Nov. 1, 2011 issued on PCT/JP2011/068284.
Notice of Allowance dated Feb. 9, 2013 issued in JP2011-553194.
Office Action dated Nov. 2, 2012 issued in U.S. Appl. No. 13/294,065.
Notice of Allowance dated Apr. 30, 2013 issued in U.S. Appl. No. 13/294,065.
European Search Report dated May 3, 2013 issued in European Patent Application EP 11797294.3.
International Search Report dated Nov. 27, 2012 issued in PCT/JP20121070492.
Notice of Allowance dated Apr. 16, 2012 issued in JP2012-503813 (JP202-503813 is a corresponding Japanese application of U.S. Appl. No. 13/363,166).
European Search Report for EP11810981 dated May 23, 2013.
Supplemental Notice of Allowability for related U.S. Appl. No. 13/294,065 dated Jun. 17, 2013.
US Supplemental Notice of Allowance dated Aug. 22, 2013.
US Notice of Allowance dated Aug. 12, 2013.
International Search Report (ISR) with a mailing date of Apr. 25, 2012 as issued in PCT/JP2012/001077.
International Preliminary Report on Patentability (IPRP) with a mailing date of Oct. 17, 2013, as issued in PCT/JP2012/001077.
International Preliminary Report on Patentability (IPRP) as mailed on Oct. 17, 2013, as issued in PCT/JP2011/058647 with English Translation.
International Preliminary Report on Patentability (IPRP) as mailed on Oct. 17, 2013, as issued in PCT/JP2011/071673 with English Translation.
Decision to Grant a European Patent mailed Dec. 12, 2013, corresponds European patent application No. 117972943.
Supplemental Notice of Allowability mailed Nov. 14, 2013 for related U.S. Appl. No. 13/294,065.

* cited by examiner

POWER GENERATING APPARATUS OF RENEWABLE ENERGY TYPE

The present Application is a Bypass Continuation of International Application No. PCT/JP2011/071673, filed on Sep. 22, 2011; which Application claims priority benefit of PCT/JP2011/058647, filed Apr. 5, 2011 and PCT/JP2011/068284, filed Aug. 10, 2011.

TECHNICAL FIELD

The present invention relates to a power generating apparatus of renewable energy type which transmits rotation energy of a rotor from a renewable energy source to a generator, particularly a power generating apparatus of a renewable energy type having a function of cooling a hydraulic transmission.

BACKGROUND ART

From the perspective of preserving the global environment, power generating apparatuses of a renewable energy type such as a wind turbine generator using wind power and a tidal generator using tidal current, river current or ocean current energy are becoming popular. To improve power generation efficiency, it is desired to increase the size of the power generating apparatus of the renewable energy type. Particularly, wind turbine generators installed offshore are expensive to construct in comparison to those installed onshore and thus, it is desired to improve power generation efficiency by increasing the size of the wind turbine generator so as to improve profitability.

In the case of the power generating apparatus of renewable energy type equipped with a mechanical gearbox, weight and cost of the gearbox tends to increase with increase in size of the apparatus. Thus, a power generating apparatus equipped with a hydraulic transmission having a hydraulic pump and a hydraulic motor, instead of the mechanical gearbox, is becoming popular.

As the power generating apparatus of renewable energy type equipped with the hydraulic transmission, a wind turbine generator having a hydraulic pump, a hydraulic motor and a generator in a nacelle is introduced in Patent Literature 1, for example. In the wind turbine generator, a rotation energy of a rotor is transmitted to the generator via the hydraulic transmission (see FIG. 7 of Patent Literature 1).

A wind turbine generator disclosed in Patent Literature 2 has a hydraulic pump installed in the nacelle, and a hydraulic motor and a generator installed at a bottom of a tower and the hydraulic pump and the hydraulic motor are connected by a piping.

Meanwhile, with increased output of the generator produced by the larger wind turbine generator, heat loss from the generator increases. In the wind turbine generator having the hydraulic transmission formed by the hydraulic pump and the hydraulic motor, in addition to the heat loss from the generator, there is heat loss from the hydraulic transmission. Thus, a wind turbine generator having a function of cooling a heat-producing component such as the generator and the hydraulic transmission is desired.

In view of this, Patent Literature 3 proposes a wind turbine generator having a cooling system for cooling a converter, a transformer and a control unit. The cooling system includes a plurality of heat exchangers installed around a tower. In the heat exchangers, a cooling medium having cooled the converter, the converter, the transformer and the control unit is cooled by heat exchange with atmospheric air.

Patent Literature 4 discloses a cooling device for a wind turbine generator. The cooling device has a heat exchanger to cool a plurality of devices such as a converter, a transformer, a bearing box and a generator. Cooling water cools the devices and then is cooled by the heat exchanger installed on an outer wall of a tower and a nacelle.

CITATION LIST

Patent Literature

[Patent Literature 1]
WO 2007/053036
[Patent Literature 2]
WO 2009/064192
[Patent Literature 3]
EP 1798414A
[Patent Literature 4]
EP 2007184A

SUMMARY OF INVENTION

Technical Problem

Normally, a power generating apparatus of renewable energy type, which generates electric power from renewable energy such as wind power, tidal current, river current and ocean current, is installed where there is significant temperature change of a surrounding environment such as temperature of ambient air, water and so on. This changes a temperature of an operating oil of the hydraulic transmission. The viscosity of the operating oil changes in accordance with the temperature change. At a low temperature, the viscosity of the operating oil becomes high, resulting in significant energy loss in the hydraulic transmission. At a high temperature, the viscosity of the operating oil decreases, resulting in accelerating degradation of the operating oil. This leads to a decline of the lubricating property, wear of the sliding part and leaking of the operating oil. Therefore, in the power generating apparatus installed with the hydraulic transmission, it is desired to keep the operating oil at an appropriate temperature. However, such technique is not disclosed in the prior art such as Patent Literatures 3 and 4.

In the cooling system disclosed in Patent Literatures 3 and 4 cool the cooling medium by heat exchange with ambient air after the cooling medium is used to cool the heat generating source. However, air-cooling in general does not have high heat-exchange efficiency compared to water cooling. Thus, it was necessary to use a larger fan for drawing in more ambient air or to be installed a plurality of fans.

In view of the above issues, it is an object of the present invention is to provide a power generating apparatus of renewable energy type installed with a cooling mechanism which is capable of efficiently cooling the operating oil of the hydraulic transmission.

Solution to Problem

As one aspect of the present invention, a power generating apparatus of renewable energy type which generates power from renewable energy, may include, but is not limited to: a tower; a nacelle which is supported rotatably by a tip portion of the tower; a main shaft which is housed in the nacelle and rotates with a blade; a hydraulic pump which is housed in the nacelle and is driven by rotation of the main shaft; a hydraulic motor which is driven by operating oil supplied from the hydraulic pump; a generator which is coupled to the hydraulic motor; an operating-oil line which is provided between the hydraulic pump and the hydraulic motor and through which the operating oil circulates; a cooling-medium line through which cooling medium for cooling the operating oil circulates via an intermediate heat exchanger; and a main heat exchanger which cools the cooling medium by heat exchange with cool water source which is one of sea water, lake water, river water and groundwater around a base portion of the tower, and one of the operating-oil line and the cooling-medium line may include, but is not limited to: a first piping which is supported on a nacelle side; a second piping which is supported on a tower side; and a connection part which connects the first piping and the second piping so that the first piping and the second piping are relatively rotatable.

According to the aspect of the present invention, the cooling medium used to cool the operating oil, is cooled by heat exchange with the cool water source which is one of sea water, lake water, river water and groundwater around the base portion of the tower and thus, the cooling medium can be cooled by the cool water with high efficiency.

Further, one of the operating-oil line and the cooling-medium line is divided into the first piping supported on the nacelle side and the second piping supported on the tower side and the first piping and the second piping are arranged relatively rotatable with each other by means of the connection part having the swivel structure. Therefore, even when the nacelle turns, the fluid can communicate smoothly between the first piping on the nacelle side and the second piping on the tower side In the above power generating apparatus of renewable energy type, the hydraulic motor may be provided between the tip portion and the base portion of the tower, the operating-oil line may extend between the hydraulic pump arranged in the nacelle and the hydraulic motor arranged in the tower, the operating-oil line may include the first piping, the second piping and the connection part, and the first piping may be connected to the hydraulic pump and the second piping is connected to the hydraulic motor.

In this manner, by arranging the hydraulic motor between the tip portion and the base portion of the tower, the operating-oil line extends to the tower side. Thus, the heat exchange can be performed between the operating oil and the cooling medium in the tower. Therefore, it is no longer necessary to extend the cooling-medium line for cooling the operating oil to the nacelle. Hence, in comparison to the case in which the cooling medium is pumped to the nacelle height by the cooling-medium line, it is possible to reduce the input of the pump and to downsize the pump.

Alternatively, in the above power generating apparatus of the renewable energy type, the hydraulic motor may be supported on the nacelle side and the intermediate heat exchanger is supported on the tower side, the operating-oil line may include an operating-oil circulation line through which the operating oil circulates between the hydraulic pump and the hydraulic motor, and an operating-oil branch line which branches from a low-pressure side of the operating-oil circulation line and through which the operating-oil line returns to the operating-oil circulation line via the intermediate heat exchanger, the operating-oil branch line may include the first piping, the second piping and the connection part, and the first piping may be connected to the operating-oil circulation line and the second piping is connected to the intermediate heat exchanger.

In this manner, by supporting the hydraulic motor on the nacelle side and connecting the operating-oil branch line branching from the low-pressure side of the operating-oil circulation line to the intermediate heat exchanger on the tower side, the operating-oil circulation line where the flow amount of the operating oil is large can be shorter while reducing the flow amount of the operating oil passing through the connection part. By this, the piping structure can be simplified. Further, the operating-oil branch line branches from the low pressure side of the operating-oil circulation line and thus, the operating-oil branch line and the connection part 100 can be formed by a piping of low pressure-resistance, resulting in cost reduction.

Alternatively, in the above power generating apparatus of renewable energy type, the hydraulic motor and the generator may be arranged in the nacelle and the intermediate heat exchanger is supported on the nacelle side, the cooling-medium line may include the first piping, the second piping and the connection part, and the first piping may be connected to an intermediate heat exchanger side and the second piping is connected to a main heat exchanger side.

In this manner, by arranging the hydraulic motor and the generator in the nacelle and by connecting the cooling-medium line via the connection part to the intermediate heat exchanger supported on the nacelle side, the connection part can be formed by a piping of low pressure-resistance, resulting in cost reduction.

The above power generating apparatus of renewable energy type may include, but is not limited to: at least one first flow path in which fluid flows from the nacelle side to the tower side; at least one second flow path in which fluid flows from the tower side to the nacelle side; a tubular member in which the at least one first flow and the at least one second flow path are formed; a first jacket which is provided around the tubular member and which includes a circular flow path which communicates with the first piping through a first communication opening; and a second jacket which is provided around the tubular member and which includes a circular flow path which communicates with the second piping through a second communication opening, and the first jacket and the second jacket are fixed to the tubular member via a bearing to be freely rotatable relative to the tubular member.

In the above power generating apparatus of renewable energy type, the fluid flowing from the nacelle side to the tower side enters the first flow path formed in the tubular member via the first communication opening from the circular flow path of the first jacket connected to the first piping so as to flow from the first flow path to the second piping. Meanwhile, the fluid flowing from the tower side to the nacelle side, enters the second flow path formed in the tubular member via the second communication opening from the circular path of the second jacket connected to the second piping so as to flow from the second flow path to the first piping. The first jacket and the second jacket are arranged relatively rotatable with respect to the tubular member via the bearing and thus, the relative rotation between the piping on the nacelle side and the piping on the tower side while securing the flow of the fluid flowing from the nacelle side to the tower side and the flow of the fluid flowing from the tower side to the nacelle side and the flow of the fluid In the above case, the tubular member may have a cable-housing piping on an inner side of the first and second flow paths, the cable-housing piping housing a cable extending from the nacelle side to the tower side.

By this, even when the nacelle turns, the cable is housed in the cable-housing piping formed in the tubular member and thus, protected against damage The above power generating apparatus of renewable energy type may include, but is not limited to: a water supply source which supplies water to the cooling-medium line; and a pump which circulates cooling-medium in the cooling-medium line, the cooling-medium being formed by adding antifreeze to the water.

In this manner, by providing the water supply source which supplied water to the cooling-medium line and the pump which circulates the cooling-medium in the cooling-medium line, a flow rate of the circulating cooling medium can be regulated, for instance, in accordance with a temperature change of the ambient air or the like and the operating oil can be maintained at a constant temperature. Further, by using the cooling medium being formed by adding antifreeze to the water, even when the ambient air becomes not greater than a freezing temperature of the water, freezing of the cooling-medium is prevented and thus, the smooth operation of the cooling mechanism can be achieved.

In the above case, the water supply source may be a cooling-medium tank which stores the cooling medium, and the cooling-medium tank may be arranged in an upper part of the tower and open to a space inside the tower.

By arranging the cooling-medium tank in the upper part of the tower and allowing the cooling medium tank to be open to the space inside the tower, it is possible to maintain sufficient water pressure in a lower part of the cooling-medium line and thus to positively supply the cooling medium to the cooling devices connected to the cooling-medium line. With use of siphon effect, it is possible to reduce the input of the pump and to downsize the pump.

Further, in the above case, the water supply source may be a cooling-medium tank which stores the cooling medium, and the cooling-medium tank may be arranged in an upper part of the tower and is sealed off from a space inside the tower.

In this manner, by arranging the cooling-medium tank inside the tower and sealing the cooling-medium tank from the space inside the tower, the position where the cooling-medium tank is arranged is no longer restricted. For instance, the cooling-medium tank may be arranged in a lower part of the cooling-medium line.

The above power generating apparatus of renewable energy type may further include: a casing which houses the main heat exchanger and has an inlet for the cool water source; and a filter which is provided at the inlet for the cool water source of the casing to prevent foreign objects contained in the cool water source from entering the casing.

As described above, the cool water source is one of sea water, lake water, river water and groundwater and the foreign objects such as marine organisms float are included in such water. The foreign objects attached to the heat exchanger tube of the main heat exchanger leads to a decline of the heat exchange efficiency. Especially, attached organisms grow on the heat exchanger tube and thus, it is unavoidable that the heat exchange efficiency decreases gradually. In view of this, by providing the filter in a water inlet of the casing housing the main heat exchanger, the foreign objects are kept from entering the area around the heat exchanger tube, thereby preventing the decline of the heat exchange efficiency.

In the above power generating apparatus of renewable energy type, the main heat exchanger may be arranged on a base on which the tower is installed.

By this, the structure of the main heat exchanger on the cool water side can be simplified.

In such case, a flow-rate regulating structure may be provided around the heat exchanger tube of the heat exchanger to regulate a flow rate of the cool water source, and a distance between the flow-rate regulating structure and the heat exchanger tube may have an upper limit which is set based on a distance at which a set heat transfer coefficient is achieved in the heat exchanger tube, and a lower limit which is set based on a distance at which foreign objects adhered to the heat exchanger tube is detached.

The flow-rate regulating structure is provided around the heat exchanger tube so as to achieve an appropriate heat transfer coefficient as the flow rate of the cool water source flowing around the heat exchanger tube affects the heat transfer coefficient of the heat exchanger tube. Therefore, by setting the upper limit of the distance between the flow-rate regulating structure and the heat exchanger tube based on a distance at which a set heat transfer coefficient is achieved in the heat exchanger tube, it is possible to achieve heat transfer coefficient appropriate for cooling the cooling medium. Further, by setting the lower limit of the distance based on a distance at which foreign objects adhered to the heat exchanger tube is detached, it is possible to prevent the foreign objects from accumulating on the heat exchanger tube.

In the above case, a spray nozzle which sprays the cool water source to a surface of a heat exchanger tube of the main heat exchanger, may be provided.

By this, even when the foreign objects contained in the cool water source adhere to the heat exchanger tube of the main heat exchanger, the cool water source jetted from the spray nozzles can remove the foreign objects from the heat exchanger tube. In this manner, the foreign objects are physically removed by means of the spray nozzles. Thus, it is no longer necessary to apply paint containing harmful ingredients on the heat exchanger or to inject chorine. It is now possible to prevent the foreign objects from adhering to or accumulating on the heat exchanger tube and also to minimize the impact on the environment.

Alternatively, in the above case, the heat exchanger may be a multitube heat exchanger having a plurality of heat exchanger tubes.

In this manner, the use of the multitube heat exchanger as the heat exchanger achieves a cheap cost and increases a heat-transfer area, hence keeping the high heat exchanger efficiency in the heat exchanger. The heat exchanger here refers to the main heat exchanger or the intermediate heat exchanger.

Further, the power generating apparatus of renewable energy type may be a wind turbine generator, the tower may extend upward in a vertical direction from the base portion toward the tip portion, and the main shaft may rotate upon receiving wind on the blade.

The above power generating apparatus of renewable energy type may further include a generator cooler which is housed in the nacelle and which cools the generator by air drawn in from a periphery of the nacelle.

In this manner, by combining the cooling of the cooling medium by cool water and the cooling of the generator by air, it is possible to attain an effective cooling mechanism for the power generating apparatus of renewable energy type.

As another aspect of the present invention, a power generating apparatus of renewable energy type which generates power from renewable energy, may include but is not limited to: a tower; a nacelle which is supported rotatably at a tip portion of the tower; a main shaft which is housed in the nacelle and rotates with a blade; a hydraulic pump which is housed in the nacelle and is driven by rotation of the main shaft; a hydraulic motor which is driven by operating oil supplied from the hydraulic pump; a generator which is coupled to the hydraulic motor; an operating-oil circulation line which is provided between the hydraulic pump and the hydraulic motor and through which the operating oil circulates; a main heat exchanger which cools the operating oil by heat exchange with cool water source which is one of sea water, lake water, river water and groundwater around a base portion of the tower; and an operating-oil branch line which branches from the operating-oil circulation line, and one of the operating oil circulation line and the operating-oil branch line may include, but is not limited to: a first piping which is supported on a nacelle side; a second piping which is supported on a tower side; and a connection part which connects the first piping and the second piping so that the first piping and the second piping are relatively rotatable.

According to the other aspect of the present invention as described, the operating oil is cooled by heat exchange with cool water source which is one of sea water, lake water, river water and groundwater around the base portion of the tower. Therefore, the operating oil can be cooled by the cool water source with high efficiency.

Further, one of the operating-oil circulation line and the operating-oil branch line is divided into the first piping supported on the nacelle side and the second piping supported on the tower side, and the first piping and the second piping are arranged relatively rotatable with each other by means of the connection part having the swivel structure. Therefore, even when the nacelle turns, the fluid can communicate smoothly between the first piping on the nacelle side and the second piping on the tower side.

In such case, the power generating apparatus of renewable energy type may be provided with a generator cooler which is housed in the nacelle and which cools the generator by air drawn in from a periphery of the nacelle.

In this manner, by combining the cooling of the operating oil by cool water and the cooling of the generator by air, it is possible to attain an effective cooling mechanism for the power generating apparatus of renewable energy type.

Advantageous Effects of Invention

In the one aspect of the present invention, the cooling medium used to cool the operating oil, is cooled by heat exchange with the cool water source which is one of sea water, lake water, river water and groundwater around the base portion of the tower and thus, the cooling medium can be cooled by cool water with high efficiency.

Further, one of the operating-oil line and the cooling-medium line is divided into the first piping supported on the nacelle side and the second piping supported on the tower side and the first piping and the second piping are arranged relatively rotatable with each other by means of the connection part having the swivel structure. Therefore, even when the nacelle turns, the fluid can communicate smoothly between the first piping on the nacelle side and the second piping on the tower side.

In the other aspect of the present invention, the operating oil is cooled by heat exchange with cool water source which is one of sea water, lake water, river water and groundwater around the base portion of the tower. Therefore, the operating oil can be cooled by the cool water source with high efficiency.

Further, one of the operating-oil circulation line and the operating-oil branch line is divided into the first piping supported on the nacelle side and the second piping supported on the tower side, and the first piping and the second piping are arranged relatively rotatable with each other by means of the connection part having the swivel structure. Therefore, even when the nacelle turns, the fluid can communicate smoothly between the first piping on the nacelle side and the second piping on the tower side.

DESCRIPTION OF EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present invention.

First Embodiment

Figure 1:
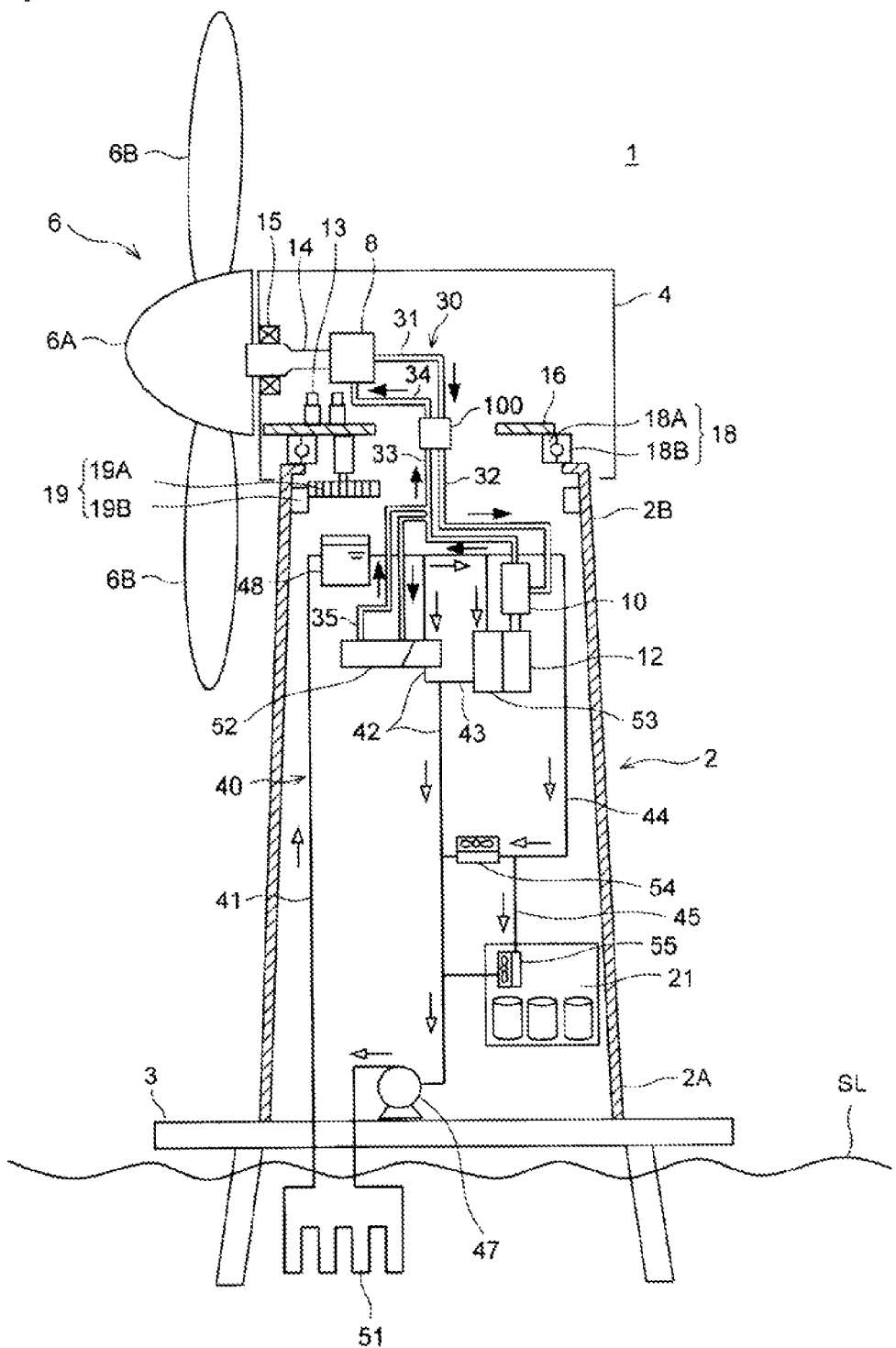
FIG. 1 shows a general structure of a wind turbine generator in relation to a first embodiment of the present invention.

In a first embodiment, a wind turbine generator is described as an example of a power generating apparatus of renewable energy type. FIG. 1 shows a general structure of the wind turbine generator in relation to the first embodiment.

As shown in FIG. 1, the wind turbine generator 1 is mainly formed by a tower 2, a nacelle 4 provided at a tip portion 2B of the tower 2, a rotor 6 being rotated by wind, a hydraulic pump 8, a hydraulic motor 10 and a generator 12 being coupled to the hydraulic motor 10.

The wind turbine generator 1 shown in FIG. 1 is an offshore wind turbine generator installed at a sea level SL. However, this is not limitative and the wind turbine generator 1 may be installed on shore where cool water source is available nearby.

The tower 2 is installed upright on a base 3 which is arranged at a height near the seal level. The tower 2 extends upward from a base portion 2A facing the base 3 to the tip portion 2B in a vertical direction. The nacelle 4 is provided on the tip portion 2B of the tower 2.

The nacelle 4 has a baseplate 16 which is rotatably supported by the tip portion 2B of the tower 2 via a nacelle bearing 18. Specifically, the nacelle baseplate 16 is fixed to an inner race 18A of the nacelle bearing 18 and the tip portion 2B of the tower is fixed to an outer race 18B of the nacelle bearing 18.

A nacelle swivel mechanism 19 is installed to the nacelle baseplate 16 and a yaw driving mechanism 13 is mounted on the nacelle baseplate 16. By means of the nacelle swivel mechanism 19 and the yaw driving mechanism 13, the nacelle baseplate 16 swivel with respect to the tip portion 2B of the tower 2.

The nacelle swivel mechanism 19 may be formed, for instance, by an internal gear 19B provided on an inner periphery of the tip portion 2B of the tower 2 and a gear 19A meshing with the internal gear 19B.

The yaw driving mechanism 13 may be, for instance, directly coupled to a shaft of the gear 19A or formed by a reducer connected to the gear 19A via a pinion, a clutch, a yaw motor, an electromagnetic break, and a housing which houses these components.

With the above structure, when the electromagnetic break is turned ON in a state that the clutch is connected, a driving force of the yaw motor is transmitted to the gear 19A via the reducer and then the gear 19A revolves while meshing with the internal gear 19B. By this, the nacelle 4 turns with respect to the tower 2 in a yaw direction.

The nacelle 4 houses a main shaft 14 and the hydraulic pump 8 connected to the main shaft 14. The main shaft 14 is rotatably supported by the nacelle via a main shaft bearing 15.

The rotor 6 includes a hub 6A and a plurality of blades 6B extending radially from the hub 6A. The hub 6A of the rotor 6 is coupled to the main shaft 14. Thus, when the rotor 6 rotates upon receiving the wind, the main shaft rotates with the hub 6A. Then, the rotation of the main shaft 14 is inputted to the hydraulic pump 8 and the hydraulic pump 8 generates operating oil of high pressure (high pressure oil).

The hydraulic motor 10 is arranged in a space inside the tower between the tip portion 2B and the base portion 2A of the tower. Preferably, the hydraulic motor 10 is arranged at a position closer to the tip portion 2B than to the base portion 2A, i.e. on an upper side of the tower. Meanwhile, the hydraulic motor 10 is supported on the tower side. For instance, the hydraulic motor 10 may be mounted on a floor, a board, a shelf or the like which is fixed to the tower 2.

The hydraulic motor 10 is driven by the high pressure oil supplied from the hydraulic pump 8 arranged in the nacelle 4.

The generator 12 connected to the hydraulic motor 10 via an output shaft, is also supported on the tower side. The generator 12 may be also mounted on a floor, a board, a shelf or the like.

A relative position between the hydraulic motor 10 and the generator 12 may be horizontal to each other or vertical to each other as shown in FIG. 1.

An operating-oil line 30 is provided between the hydraulic pump 8 and the hydraulic motor 10 and the operating oil flows in the operating-oil line 30.

The operating-oil line 30 includes a high-pressure side piping through which the high pressure oil is supplied from the hydraulic pump 8 to the hydraulic motor 10, and a low-pressure side piping through which the operating oil of low pressure (low pressure oil) is supplied from the hydraulic motor 10 to the hydraulic pump 8.

The high-pressure side piping is formed by a first high-pressure side piping 31 (first HP piping) which is supported on the nacelle side, a second high-pressure side piping 32 (second HP piping) which is supported on the tower side. Between the first HP piping 31 and the second HP piping 32, a connection part 100 is provided. The connection part 100 has a swivel structure and the first HP piping 31 and the second HP piping 32 are connected by the connection part 100 so as to be relatively rotatable.

The low-pressure side piping is formed by a first low-pressure side piping 34 (first LP piping) which is supported on the nacelle side, a second low-pressure side piping 33 (second LP piping) which is supported on the tower side. Between the first LP piping 34 and the second LP piping 33, the connection part 100 is provided. The first LP piping 34 and the second LP piping 33 are connected by the connection part 100 so as to be relatively rotatable.

The connection part 100 having the swivel structure is arranged at a rotation center of the nacelle 4. The configuration of the connection part 100 is described later in detail.

The operating-oil line 30 also includes an operating-oil branch line 35 through which at least a part of the low pressure oil from the second LP piping 33 is fed to an intermediate heat exchanger 52 and the low pressure oil discharge from the intermediate heat exchanger 52 returns to the second LP piping 33. The operating oil branched from the operating-oil branch line 35 is cooled by heat exchange with cooling-medium in the intermediate heat exchanger 52 and returns to the second LP piping 33.

The hydraulic pump 8 is driven by the main shaft 14 and generates the high pressure oil. The high pressure oil is supplied to the hydraulic motor 10 via the high-pressure side piping to drive the hydraulic motor by the high pressure oil. Meanwhile, the generator 12 coupled to the hydraulic motor 10 is driven and the generator 12 generates electric power. The low pressure oil discharged from the hydraulic motor 10 is supplied to the hydraulic pump 8 via the low-pressure side piping. The low pressure oil is pressurized again by the hydraulic pump 8 to generate the high pressure oil and the high pressure oil is fed to the hydraulic motor 10.

In the embodiment, a cooling mechanism is also provided to cool the operating oil flowing in the operating-oil line 30. The cooling mechanism may be used for a variety of cooling devices for cooling a heat-generating source in the nacelle 4 or in the tower 2. The cooling mechanism is now described in detail.

The cooling mechanism mainly includes a main heat exchanger 51, the intermediate heat exchanger 52 and a cooling-medium line 40.

The main heat exchanger 51 cools the cooling medium by heat exchange with cool water source which is one of sea water, lake water, river water and groundwater around the base portion 2A of the tower 2. In the offshore wind turbine generator shown in FIG. 1, the main heat exchanger 51 is installed to the base 3 of the tower 2 and is configured to cool the cooling medium by heat exchange with the sea water. This simplifies a piping structure of the cool water side of the main heat exchanger 51.

The intermediate heat exchanger 52 is arranged in the tower 2 and cools the operating oil by heat exchange with the cooling medium.

The cooling-medium line 40 is arranged in the tower 2 and is a closed loop through which the cooling medium for cooling the operating oil circulates. As the cooling medium, water, oil, water to which antifreeze is added, or the like may be used. Specifically, the cooling-medium line 40 includes a cooling-medium supply line 41 which is provided between the main heat exchanger 51 and the intermediate heat exchanger 52 and through which the cooling medium having been cooled by the sea water in the main heat exchanger 51 is supplied to the intermediate heat exchanger 52, and a cooling-medium return line 42 which is provided between the intermediate heat exchanger 52 and the main heat exchanger 51 and through which the cooling medium after cooling the operating oil in the intermediate heat exchanger 52 returns to the main heat exchanger 51.

The cooling-medium line 40 includes a cooling-medium branch line 43 which branches from the cooling-medium supply line 41 and through which the cooling medium returns to the cooling-medium return line 42. In the cooling-medium branch line 43, a generator cooler 53 is provided to cool the generator 12.

The generator cooler 53 may be configured, for instance, as a cooling jacket formed around the generator 12. The generator cooler 53 cools the generator 12 by heat exchange with the cooling medium supplied from the cooling-medium branch line 43.

The cooling-medium line 40 includes another cooling-medium branch line 44 which branches from the cooling-medium supply line 41 and joins the cooling-medium return line 42 in a manner similar to the cooling-medium branch line 43. In the cooling-medium branch line 44, a tower cooler 54 is provided to cool the space inside the tower 2.

The tower cooler 54 is configured as a heat exchanger installed with a fan and a group of heat exchanger tubes. In the tower cooler 54, the air drawn in (or forced out) by the fan in the tower 2 is cooled by heat exchange with the cooling medium supplied to the group of heat exchanger tubes from the cooling-medium branch line 44. By this, it is possible to effectively cool the air in the tower 2, which is heated by thermal discharge from the heat generating source installed in the tower 2 of the wind turbine generator 1.

Further, the cooling-medium line 40 includes a cooling-medium branch line 45 which branches from the cooling-medium branch line 44 and joins the cooling-medium return line 42. In the cooling-medium branch line 45, a transformer-housing cooler 55 is provided to cool a space inside a transformer housing 21. The transformer housing 21 herein is a space where the transformer for transforming the electric power generated in the generator.

The transformer-housing cooler 55 is configured as a heat exchanger installed with a fan and a group of heat exchanger tubes. In the transformer-housing cooler 55, the air drawn in (or forced out) by the fan in the transformer housing 21 is cooled by heat exchange with the cooling medium supplied to the group of heat exchanger tubes from the cooling-medium branch line 45.

In the cooling-medium line 40, a cooling-medium tank 48 for storing the cooling medium and a pump for circulating the cooling medium are provided. By means of the cooling-medium tank 48 and the pump 47, a flow rate of the circulating cooling medium can be regulated, for instance, in accordance with a temperature change of the ambient air or the like. In this manner, the operating oil can be maintained at a constant temperature.

The cooling-medium tank 48 is arranged in the upper part of the tower 2, specifically in the upper part in the height direction of the cooling-medium line 40, and opens to the space inside the tower 2. In this manner, by arranging the cooling-medium tank 48 in the upper part of the tower 2 and allowing the cooling-medium tank 48 open to the space inside the tower 2, it is possible to maintain sufficient water pressure in a lower part of the cooling-medium line 40 and thus to positively supply the cooling medium to the cooling devices connected to the cooling-medium line (e.g. the intermediate heat exchanger 52, the generator cooler 53, the tower cooler 54, the transformer-housing cooler 55). With use of siphon effect, it is possible to reduce the input of the pump 47 and to downsize the pump 47.

Figure 2A:
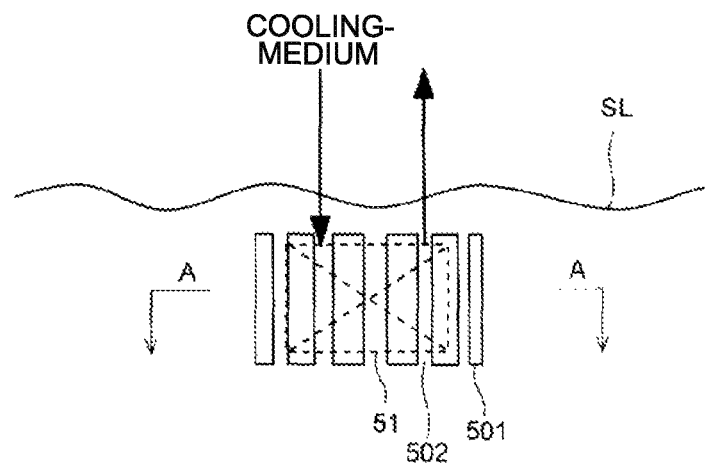
FIG. 2A is a side view of a main heat exchanger of FIG. 1 as a specific configuration example.
Figure 2B:
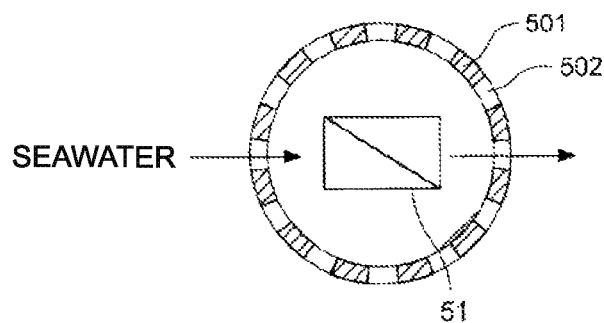
FIG. 2B is a cross-sectional view of the main heat exchanger taken along a line A-A of FIG. 2A.
Figure 2C:
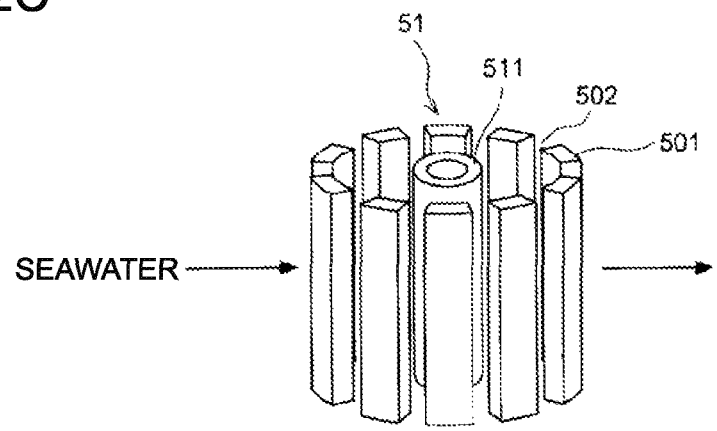
FIG. 2C is a perspective view of the main heat exchanger shown in FIG. 2A.

The main heat exchanger 51 described above may include the configuration shown in FIG. 2A to FIG. 2C. FIG. 2A is a side view of the main heat exchanger of FIG. 1 as a specific configuration example. FIG. 2B is a cross-sectional view of the main heat exchanger taken along the line A-A of FIG. 2A. FIG. 2C is a perspective view of the main heat exchanger shown in FIG. 2A.

As shown in FIG. 2A through FIG. 2C, the main heat exchanger 51 is provided with a heat exchanger tube 511 through which the cooling medium flows from the cooling-medium line 40 and the sea water flows around the heat exchanger tube 511. Hence, there is no need to provide a piping for streaming the sea water. Further, around the heat exchanger tube 511 of the main heat exchanger 51, a flow-rate regulating structure is provided to regulate a flow rate of the sea water. The flow-rate regulating structure is provided around the heat exchanger tube 511 so as to achieve an appropriate heat transfer coefficient as the flow rate of the sea water flowing around the heat exchanger tube 511 affects the heat transfer coefficient of the heat exchanger tube.

For example, concrete blocks 501 for regulating the flow rate may be provided around the heat exchanger tube 511. The flow-rate regulating blocks 501 are arranged in a circle and between the adjacent blocks 501, sea water ports are formed to allow for inflow and outflow of the sea water. In a space surrounded by the flow-rate regulating blocks 501, the sea water enters through the sea water ports 502 and flows around the heat exchanger tube 511 to cool the cooling medium. Then the sea water exits the space through the sea water ports 502 to outside. The flow-rate regulating blocks 501 maintains the flow rate of the sea water around the heat exchanger tube 511 and also blocks foreign objects contained in the sea water from contacting the heat exchanger tube 511.

Further, a distance between the flow-rate regulating block 501 and the heat exchanger tube 511 has an upper limit which is set based on a distance at which a set heat transfer coefficient is achieved in the heat exchanger tube 511, and a lower limit which is set based on a distance at which foreign objects adhered to the heat exchanger tube 511 is detached.

By setting the upper limit of the distance between the flow-rate regulating block 501 and the heat exchanger tube 511 based on the distance at which a set heat transfer coefficient is achieved in the heat exchanger tube 511, it is possible to achieve the heat transfer coefficient appropriate for cooling the cooling medium.

Meanwhile, by setting the lower limit of the distance between the flow-rate regulating block 501 and the heat exchanger tube 511 based on the distance at which foreign objects adhered to the heat exchanger tube 511 is detached, it is possible to prevent the foreign objects from accumulating on the heat exchanger tube 511. When the foreign objects such as marine organisms adhere to and accumulate on the heat exchanger tube 511, the heat transfer coefficient decrease. In the embodiment, by securing a certain amount of space around the heat exchanger tube 511, the foreign objects accumulated on the heat exchanger tube 511 become detached. Thus, by setting the lower limit of the distance to secure such space, it is possible to prevent the foreign objects from accumulating on the heat exchanger tube 511.

Any type of heat exchanger may be used as the main heat exchanger 51. For the purpose of achieving a cheap cost and also increasing a heat-transfer area, a multitube heat exchanger having a plurality of heat exchanger tubes 511 is preferable. By this, it is possible to keep the high heat exchange efficiency in the main heat exchanger 511. In a similar manner, the intermediate heat exchanger 52 may be a multitube heat exchanger having a plurality of heat exchanger tubes.

Figure 3A:
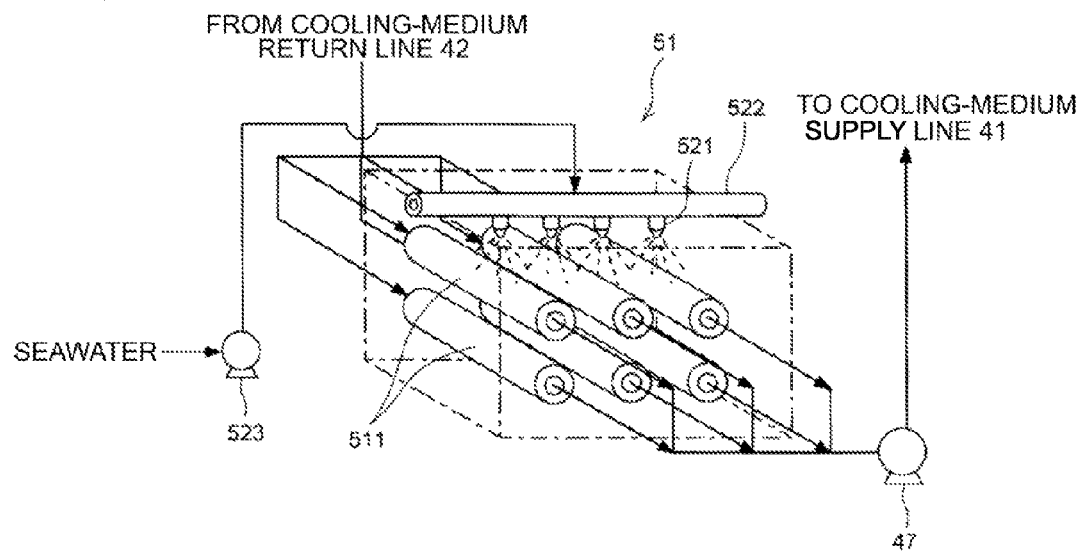
FIG. 3A is a perspective view of the main heat exchanger having an attached-object removal function.

FIG. 3A is a perspective view of the main heat exchanger having an attached-object removal function. As shown in the drawing, the main heat exchanger 51 is provided with spray nozzles 521 each of which sprays the sea water to a surface of the heat exchanger tube 511. The spray nozzles 521 are provided around the heat exchanger tube 511. Each of the spray nozzles 521 is connected to a header 522. The sea water pumped by the pump 523 is supplied to the spray nozzles 521 via the header 522 and sprayed through the spray nozzles 521 to the surface of the heat exchanger tubes 511.

By this, even when the foreign objects contained in the sea water adhere to the heat exchanger tube 511 of the main heat exchanger 51, the sea water jetted from the spray nozzles 421 can remove the foreign objects from the heat exchanger tube 511.

Figure 3B:
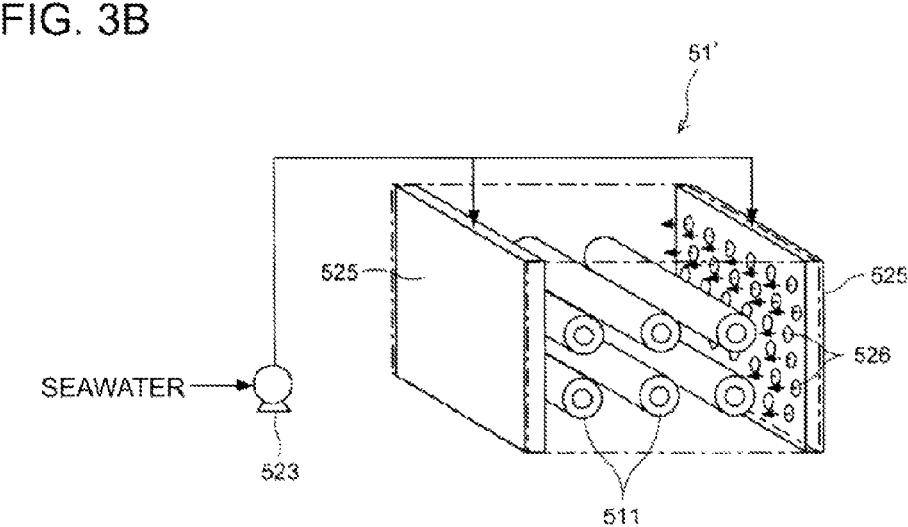
FIG. 3B is a perspective view of the main heat exchanger having another type of attached-object removal function.

FIG. 3B is a perspective view of the main heat exchanger having another type of attached-object removal function. In the drawing, the cooling-medium supply line 41, the cooling-medium return line 42 and the pump 47 are not shown. This heat exchanger 51' is arranged around the heat exchanger tube 511. The heat exchanger 51' includes a perforated header 525 having a plurality of openings 536 formed on one side of the perforated header 525. The sea water pumped by the pump 523 is jetted from the openings 526 and the jet flow is supplied around the heat exchanger tube 511. The jet flow removes the foreign objects adhered to or accumulated on the heat exchanger tube 511.

In this manner, the foreign objects are physically removed by means of the spray nozzles 521 or the perforated header 525. Thus, it is no longer necessary to apply paint containing harmful ingredients on the heat exchanger or to inject chorine in order to remove the foreign objects. It is now possible to prevent the foreign objects from adhering to or accumulating on the heat exchanger tube 511 and also to minimize the impact on the environment.

Figure 3C:
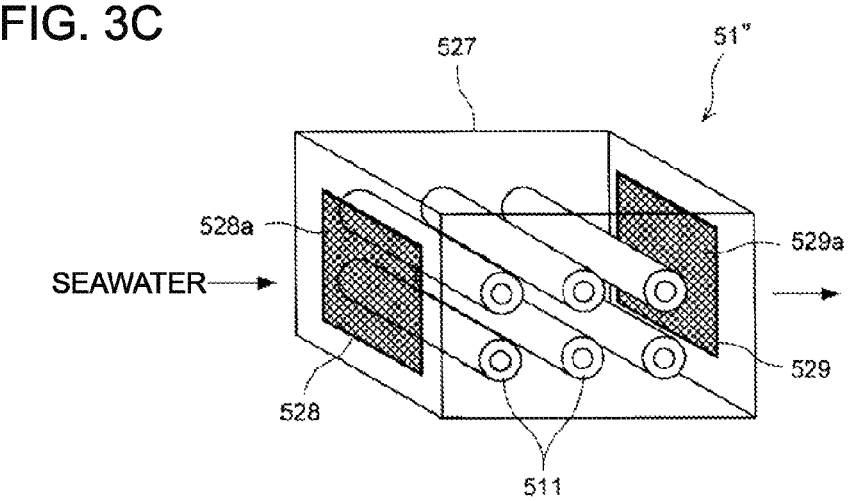
FIG. 3C is a perspective view of the main heat exchanger having yet another type of attached-object removal function.

FIG. 3C is a perspective view of the main heat exchanger having yet another type of attached-object removal function. In FIG. 3C, the cooling-medium supply line 41, the cooling-medium return line 42 and the pump 47 are not shown. The main heat exchanger 51' is configured such that the heat exchanger tube 511 is housed in a casing 527. In the casing 527, a sea water inlet 528 and a sea water outlet 529 are formed. Further, the sea water inlet 528 has a filter 528a to prevent the foreign objects contained in the sea water from entering the casing 527. As described above, the foreign objects such as marine organisms float in the sea water and the foreign objects attached to the heat exchanger tube 511 of the main heat exchanger 51 leads to a decline of the heat exchange efficiency. Especially, when the marine organisms adhere to the heat exchanger tube 511, the marine organisms grow there and thus, it is unavoidable that the heat exchange efficiency decreases gradually. Therefore, by providing the filter 528a in the sea water inlet 528 of the casing 527 housing the main heat exchanger 51, the foreign objects are kept from entering the area around the heat exchanger tube 511, thereby preventing the decline of the heat exchange efficiency. In the same manner, a filter 529a may be provided in the sea water outlet 529. The filters 528a and 529a are preferably configured interchangeable with each other.

Next, a detailed configuration example of the connection part 100 is explained in reference to FIG. 4 through FIG. 7.

Figure 4:
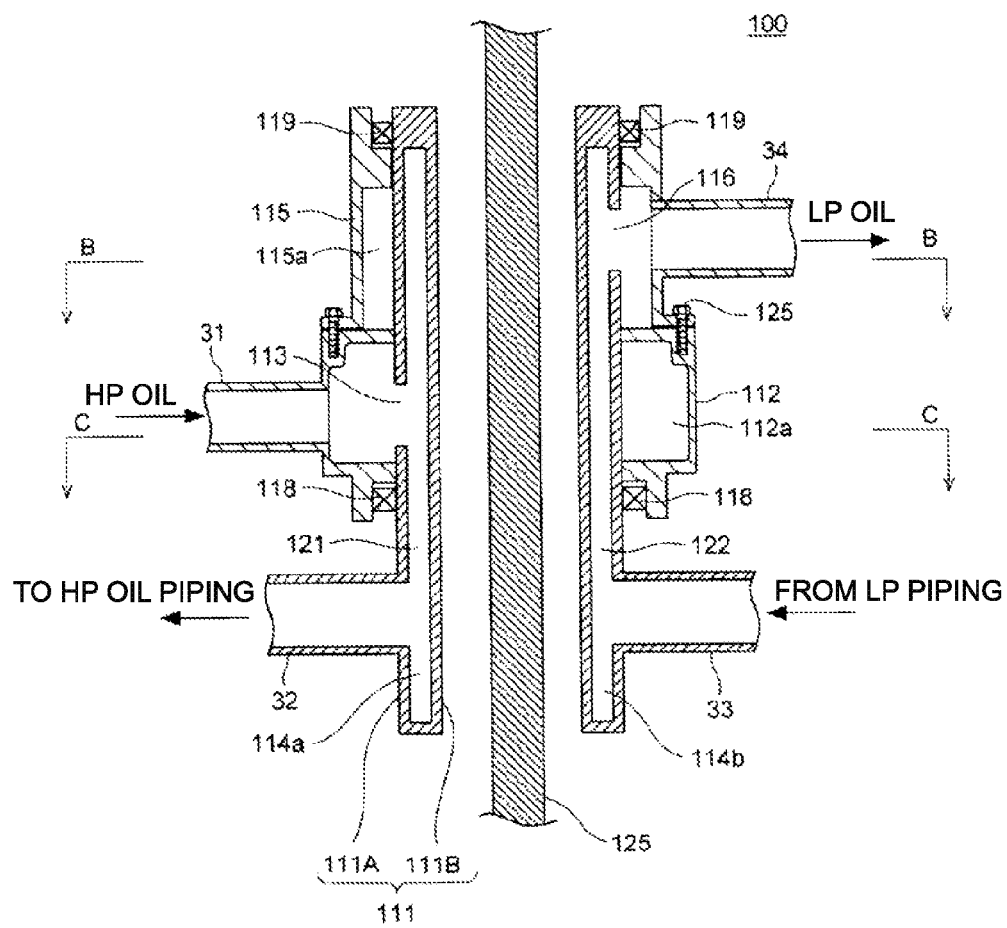
FIG. 4 shows a first configuration example of a swivel structure being applied to the wind turbine generator in relation to an embodiment of the present invention.
Figure 5A:
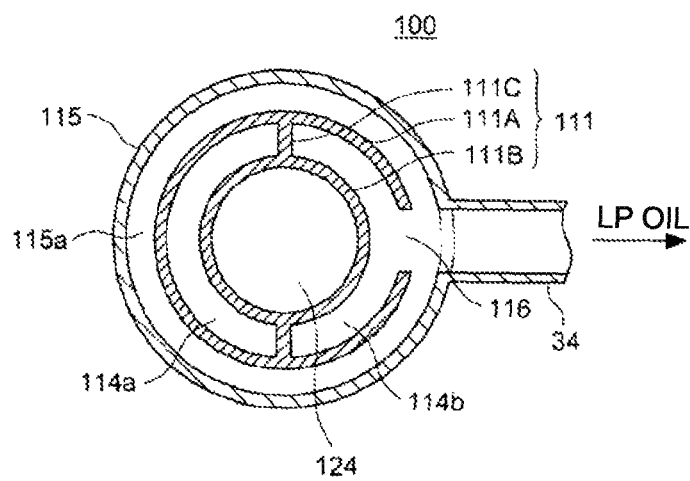
FIG. 5A is a cross-sectional view taken along a line B-B of FIG. 4, showing the first configuration example of the swivel structure of FIG. 4.
Figure 5B:
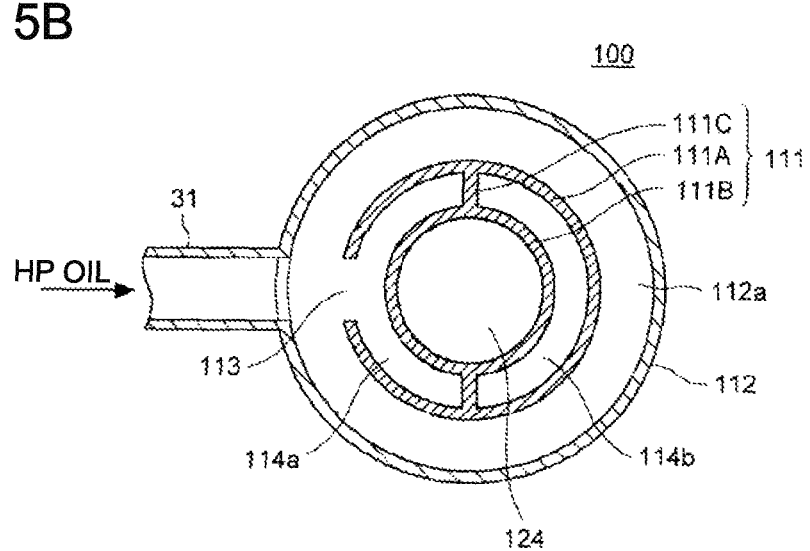
FIG. 5B is a cross-sectional view taken along a line C-C of FIG. 4, showing the first configuration example of the swivel structure of FIG. 4.

FIG. 4 shows a first configuration example of a swivel structure being applied to the wind turbine generator in relation to the embodiment of the present invention. FIG. 5A is a cross-sectional view taken along a line B-B of FIG. 4, showing the first configuration example of the swivel structure of FIG. 4. FIG. 5B is a cross-sectional view taken along a line C-C of FIG. 4, showing the first configuration example of the swivel structure of FIG. 4.

The connection part 100 of the swivel structure in the first configuration example, has a tubular member 111 which extends in the axial direction of the tower 2 and a first jacket 112 and a second jacket 115 which are provided around the tubular member 111. By the tubular member 111 and the first and second jackets 112 and 115, a first flow path 121 in which the high pressure oil flows from the hydraulic pump 8 on the nacelle side to the hydraulic motor 10 on the tower side, and a second flow path 122 in which the low pressure oil flows from the hydraulic motor 10 to the hydraulic pump 8 are formed.

The tubular member 11 has a double-tube structure formed by an outer tube 111A, an inner tube 111B and a partition wall 111C. The partition wall 111C divides a circular space formed by the outer tube 111A and the inner tube 111B in a circumferential direction to create a plurality of arc-shaped flow paths 114a and 114b. FIG. 4B shows two arc-shaped flow paths 114a and 114b. However, this is not limitative and more than two flow paths may be formed.

The first jacket is provided around the outer tube 111A of the tubular member 111. By an inner wall surface of the first jacket 112 and an outer wall surface of the outer tube 111A, a circular flow path 112a is formed. The circular flow path 112a is in communication with the first HP piping 31 connected to the outer periphery of the first jacket 112. The circular flow path 112a is in communication with the arc-shaped flow path 114a via a first communication opening 113. Further, the arc-shaped flow path 114a is in communication with the second HP piping 32 connected to the outer periphery of the outer pipe 111A. In this manner, the flow path 121 is formed by the circular flow path 112a and the arc-shaped flow path 114a. The high pressure oil supplied from the first HP piping 31 to the first flow path 121 flows through the circular flow path 112a, the first communication opening 113 and the arc-shaped flow path 114a and is supplied to the second HP piping 32.

The second jacket 115 is provided on an outer circumferential side of the outer tube 111A of the tubular member 111 and closer to the nacelle side than the first jacket 112 is. The second jacket 115 is fastened to the first jacket 112 by a bolt 125. The arc-shaped flow path 114b of the tubular member 111 is in communication with the second LP piping 33 connected to the outer periphery of the outer tube 111A. Further, the arc-shaped member is in communication with the circular flow path 115a formed between the inner wall surface of the second jacket 115 and the outer wall surface of the outer tube 111A via a second communication opening 116 formed in the outer tube 111A. Further, the circular flow path 115a is in communication with the first LP piping 34 connected to the outer periphery of the second jacket 115. In this manner, the second flow path 122 is formed by the arc-shaped flow path 114b and the circular flow path 115a. The low pressure oil supplied from the second LP piping 33 to the second flow path 122 flows through the arc-shaped flow path 114b, the second communication opening 116 and the circular flow path 115a and is fed to the first LP piping 34.

The first jacket 112 and the second jacket 115 are supported on the nacelle side 4. In contrast, the tubular member 111 is supported on the tower side. Between the first jacket 112 and the outer tube 111A, a bearing 118 is provided to maintain liquid tightness therebetween. Between the second jacket 115 and the outer tube 111A, a bearing 119a is provided to maintain liquid tightness therebetween. The first jacket 112 and the second jacket 115 are mounted relatively rotatable with respect to the tubular member 111 by means of the bearings 118 and 119.

With the above configuration, it is possible to secure the flow of the high pressure oil flowing from the hydraulic pump 8 on the nacelle side to the hydraulic motor 10 on the tower side 2 and a flow of the low pressure oil flowing from the hydraulic pump 8 to the hydraulic motor 10, and also possible to arrange the first piping (the first HP piping 31, the first LP piping 34) and the second piping (the second HP piping 32, the second LP piping 33) relatively rotatable. Therefore, even when the nacelle 4 turns, the high pressure oil and the low pressure oil can communicate between the hydraulic pump 8 in the nacelle 4 and the hydraulic motor 10 in the tower 2 via the connection part 100.

Further, in the first configuration example, the space surrounded by the inner tube 11B of the tubular member 111 may be used as a cable-housing piping 124. The cable-housing piping 124 houses a cable 125 extending from the nacelle side to the tower side. In the example, the cable-housing piping 124 houses the cable 125 such as a power cable used for supplying power to electric utilization equipments arranged in the nacelle 4 such as the hydraulic pump 8, a communication cable used for controlling, a signal cable connected to measuring devices mounted to the nacelle side, and a lightning-protection cable for discharging electric power when the lightning strikes the blade 6B or the nacelle 4. In this manner, by using the space surrounded by the inner tube 111B as the cable-housing piping 124, even when the nacelle turn 4, the cable 125 is protected against damage.

Figure 6:
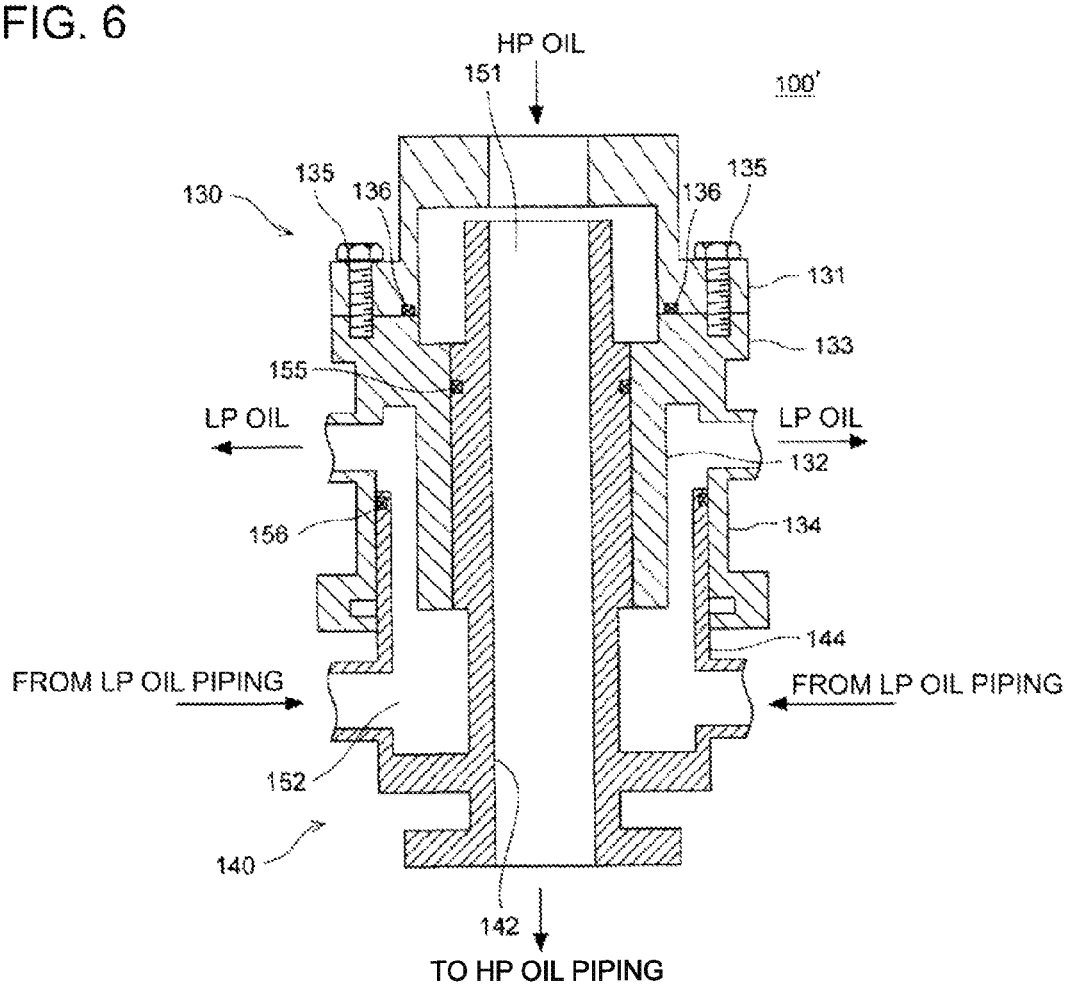
FIG. 6 shows a second configuration example of the swivel structure being applied to the wind turbine generator in relation to an embodiment of the present invention.

FIG. 6 shows a second configuration example of the swivel structure being applied to the wind turbine generator in relation to the embodiment of the present invention.

The swivel structure of the second configuration example has a connection part 100'. The connection part 100' connects the hydraulic pump 8 housed in the nacelle 4 and the hydraulic motor 10 housed in the tower 2 with use of a first double tube 130 and a second double tube 140.

The first double tube 130 is fixed to the nacelle 4 and the second double tube 140 is fixed to the tower 2. The first double tube 130 and the second double tube 140 are relative rotatable with each other.

Now, detailed configurations of the first double tube 130 and the second double tube 140 are explained.

The first double tube 130 includes an upper part 131 and a lower part 133, which are fastened at a flange portion to each other by bolts 135. Further, a bearing 136 is provided between joint surfaces of the upper part 131 and the lower part 133 to maintain liquid tightness therebetween. The upper part 131 has a HP oil inlet which is connected at a top to a discharge side of the hydraulic pump 8 via the first HP piping 31 (see FIG. 1). The lower part 133 includes an inner cylinder part and an outer cylinder part which extend downward from the flange portion fastened to the upper part 131. The outer cylindrical part has a LP oil outlet formed on a side surface. The LP oil outlet is connected to an intake side of the hydraulic pump 8 via the first LP piping 34 (see FIG. 1).

By a part of the lower part 133 (the inner cylindrical part) and the upper part 131, a first inner piping 132 of the first double tube is formed. By a part of the lower part 133 (the outer cylindrical part), a first outer piping 134 of the first double tube 130 is formed.

Meanwhile, the second double tube 140 includes a second inner piping 142 and a second outer piping 144 formed on the outer periphery of the second inner piping 142. The second double tube 140 has a HP oil outlet in a lower part thereof. The HP oil outlet is connected to the second HP piping 32 (see FIG. 1). The second double tube 140 has a LP inlet on a side surface. The LP oil inlet is connected to the second LP piping 33 (see FIG. 1).

The first double tube 130 is rotatably fitted to the second double tube 140. By fitting first double tube 130 and the second double tube 140 in this manner, a first flow path 151 where the high pressure oil flows from the nacelle side to the tower side and a second flow path 152 where the low pressure oil flows from the tower side to the nacelle side 4 are formed.

Between the inner wall surface of the first inner piping 132 and the outer wall surface of the second inner piping 142, an inner bearing 155 is provided. Further, between the inner wall surface of the first outer piping 134 and the outer wall surface of the second outer piping 144, an outer bearing 156 is provided.

In the above wind turbine generator 1 the first double tube 130 supported on the nacelle side is rotatably connected to the second double tube 140. By Therefore, even when the nacelle 4 turns, the high pressure oil and the low pressure oil can communicate between the hydraulic pump 8 in the nacelle 4 and the hydraulic motor 10 in the tower 2 via the first double tube 130 and the second double tube 140.

Figure 7:
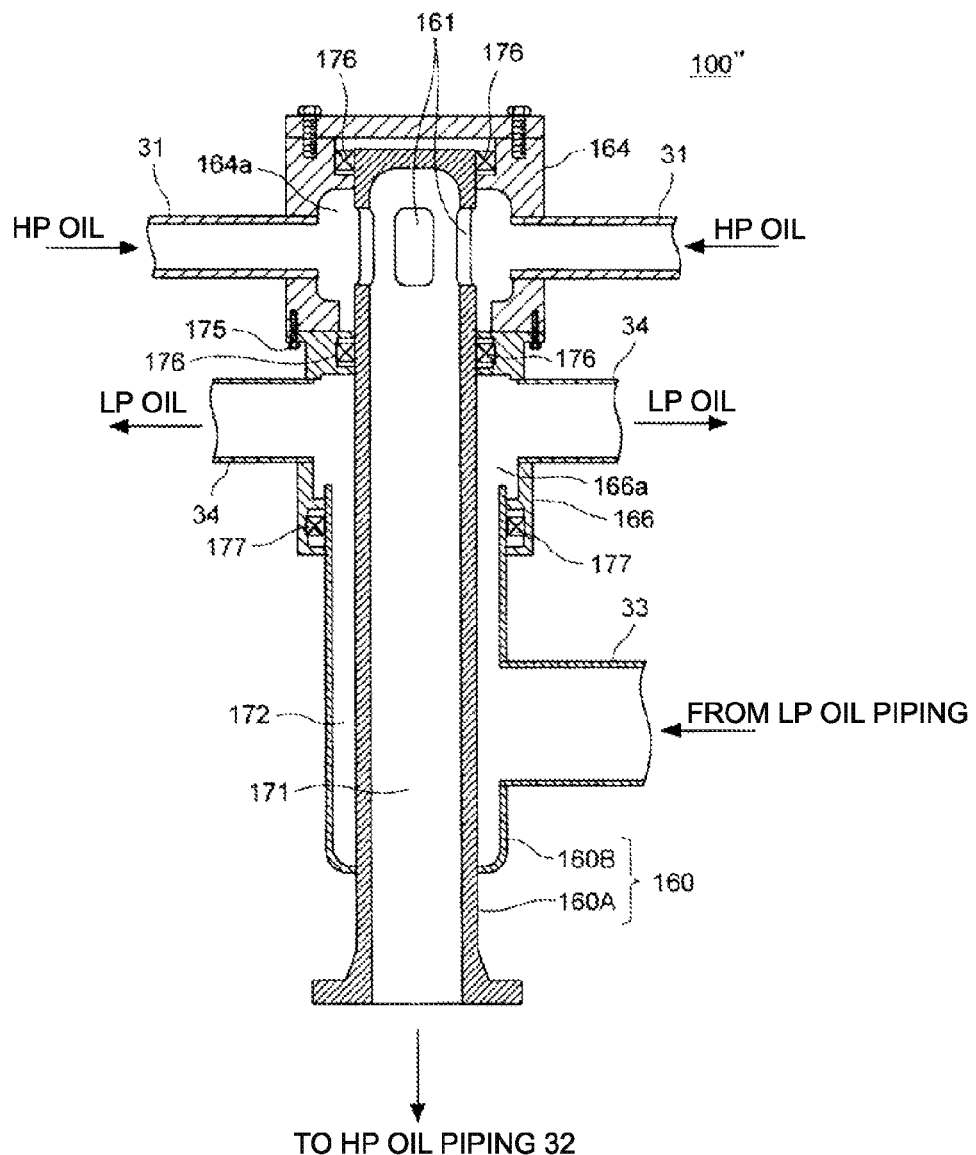
FIG. 7 shows a third configuration example of the swivel structure being applied to the wind turbine generator in relation to an embodiment of the present invention.

FIG. 7 shows a third configuration example of the swivel structure being applied to the wind turbine generator in relation to an embodiment of the present invention.

The swivel structure of the third configuration example has a connection part 100". The connection part 100" includes a double tube 160 which extends in the axial direction of the tower 2, and a first jacket 164 and a second jacket 166 which are provided to surround the double tube 160. By the double tube 160 and the first and second jackets 164 and 166, formed are a first flow path 171 through which the high pressure oil flow from the hydraulic pump 8 on the nacelle side 4 to the hydraulic motor 10 on the tower side, and a second flow path 172 through which the low pressure oil flows from the hydraulic motor 10 to the hydraulic pump 8.

The double tube 160 includes an inner tube 160A and an outer tube 160B. Inside the inner tube 160A, an inner flow path is formed. Between the inner tube 160A and the outer tube 160B, an outer flow path is formed.

The first jacket 164 is arranged on an outer circumferential side of the inner tube 160A. A circular flow path 164a is formed by an inner wall surface of the first jacket 164 and an outer wall surface of the inner tube 160A. The circular flow path 164a is in communication with the first HP piping 31 connected to the outer periphery of the first jacket 164. The circular flow path 164a is in communication with the inner flow path via a first communication opening 161 provided in the inner tube 160A. The inner flow path is in communication with the second HP piping 32 connected to a lower part of the inner tube 160A. And, the first flow path 171 is formed by the circular flow path 164a and the inner flow path. The high pressure oil supplied from the first HP piping 31 to the first flow path 171 flows through the circular flow path 164a, the first communication opening 161 and the inner flow path and then fed to the second HP piping 32.

The second jacket 166 is provided on an outer circumferential side of the outer tube 160B and closer to the tower side than the first jacket 164 is. The second jacket 166 is fastened to the first jacket 164 by a bolt 175. The outer flow path is in communication with the second LP piping 33 connected to the outer periphery of the outer tube 160B and with the circular flow path 166a formed between the inner wall surface of the second jacket 166 and the outer wall surface of the inner tube 160A. Further, the circular flow path 166a is in communication with the first LP piping 34 connected to the outer periphery of the second jacket 166. In this manner, the second flow path 172 is formed by the outer flow path and the circular flow path 166a. The low pressure oil supplied from the second LP piping 33 to the second flow path 172 flows through the outer flow path and the circular flow path 166a and is fed to the first LP piping 34.

The first jacket 164 and the second jacket 166 are supported on the nacelle side 4. In contrast, the double tube 160 is supported on the tower side. Between the first jacket 164 and the inner tube 160A of the double tube 160, a bearing 176 is provided to maintain liquid tightness therebetween. Between the second jacket 166 and the outer tube 160B, a bearing 177 is provided to maintain liquid tightness therebetween. The first jacket 164 and the second jacket 166 are mounted relatively rotatable with respect to the double tube 160 by means of the bearings 176 and 177.

With the above configuration, it is possible to secure the flow of the high pressure oil flowing from the hydraulic pump 8 on the nacelle side to the hydraulic motor 10 on the tower side 2 and a flow of the low pressure oil flowing from the hydraulic pump 8 to the hydraulic motor 10, and also possible to arrange the first piping (the first HP piping 31, the first LP piping 34) and the second piping (the second HP piping 32, the second LP piping 33) relatively rotatable. Therefore, even when the nacelle 4 turns, the high pressure oil and the low pressure oil can communicate between the hydraulic pump 8 in the nacelle 4 and the hydraulic motor 10 in the tower 2 via the connection part 100.

According to the first embodiment described above, the cooling medium used to cool the operating oil, is cooled by heat exchange with sea water around the base portion 2A of the tower 2 and thus, the cooling medium can be cooled by the sea water with higher efficiency than by air-cooling.

Further, the operating-oil line 30 is divided into the first piping supported on the nacelle side and the second piping supported on the tower side and the first piping and the second piping are arranged relatively rotatable with each other by means of the connection part 100, 100', 100" having the swivel structure. Therefore, even when the nacelle 4 turns, the fluid can communicate smoothly between the first piping on the nacelle side and the second piping on the tower side.

Furthermore, by arranging the hydraulic motor 10 between the tip portion 2B and the base portion 2A of the tower 2, the operating-oil line 30 extends to the tower side. Thus, the heat exchange can be performed between the operating oil and the cooling medium in the tower 2. Therefore, it is no longer necessary to extend the cooling-medium line 40 for cooling the operating oil to the nacelle 4. Hence, in comparison to the case in which the cooling medium is pumped to the nacelle height by the cooling-medium line 40, it is possible to reduce the input of the pump 47 and to downsize the pump 47.

Now, a modified example of the wind turbine generator 1 in relation to the first embodiment as shown in FIG. 1 is explained. Only the configuration different from first embodiment shown in FIG. 1 is explained here.

Figure 8:
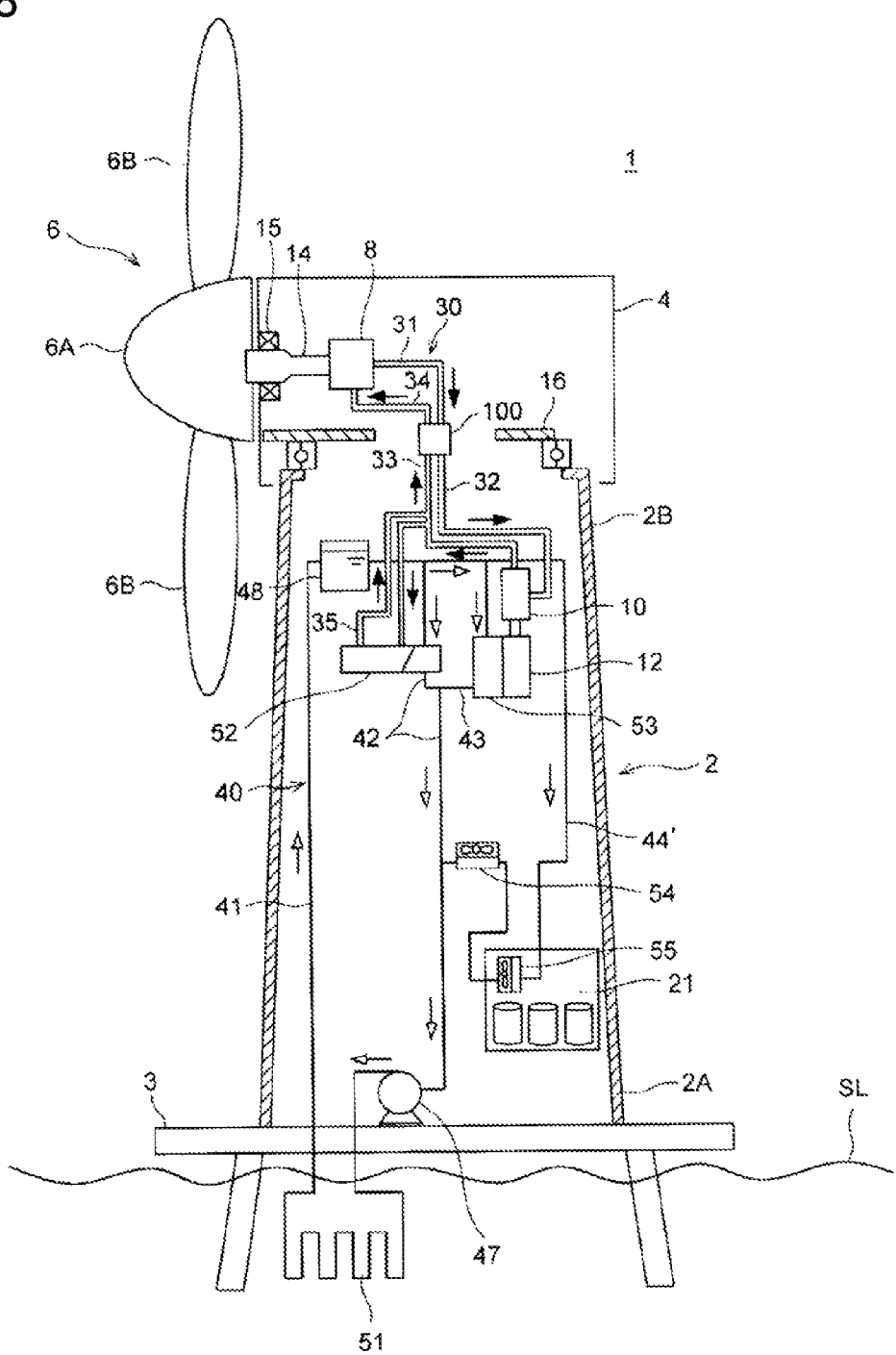
FIG. 8 is a general view showing a first modified example of the wind turbine generator of FIG. 1.

A first modified example is shown in FIG. 8. In the first modified example, a cooling-medium branch line 44' is provided. The cooling-medium branch line 44' connects the transformer housing cooler 55 and the tower cooler 54 in series. The cooling-medium branch line 44' branches from the cooling-medium supply line 41 and joins the cooling-medium return line 42. The transformer-housing cooler 55 cools the air inside the transformer housing 21 by heat exchange with the cooling medium flowing in the cooling-medium branch line 44'. Next, the cooling medium discharged from the transformer housing cooler 55 is supplied to the tower cooler 54 to cool the air inside the tower 2 by heat exchange with the cooling medium. The cooling medium having passed through those coolers returns to the main heat exchanger 51. The tower cooler 54 and the transformer-housing cooler 55 may be arranged in this order in the cooling-medium branch line 44'. However, this is not limitative and the coolers may be arranged in any order.

In this manner, by providing the cooling-medium line which connects a plurality of heat-generating sources in series, the piping structure can be simplified.

Figure 9:
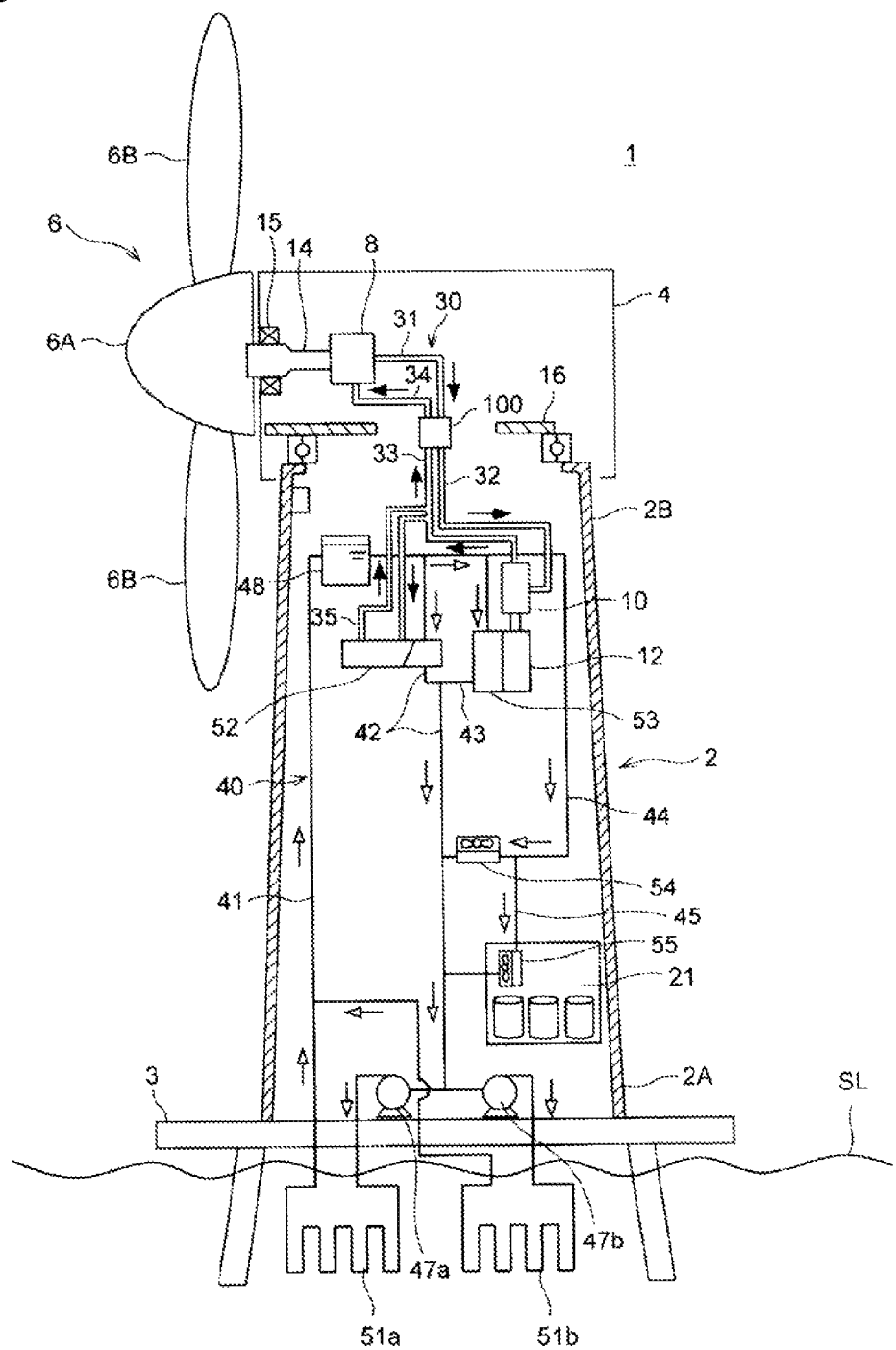
FIG. 9 is a general view showing a second modified example of the wind turbine generator of FIG. 1.

A second modified example is shown in FIG. 9. In the second modified example, a plurality of the main heat exchangers are provided. FIG. 9 shows two main heat exchangers 51a and 51b. However, this is not limitative and the number of main heat exchangers is not limited to this example. The cooling-medium return line 42 branches into two lines on an inlet side of the main heat exchangers 51a and 51b, one line being connected to the main heat exchanger 51a and other line being connected to the main heat exchanger 51b. Pumps 47a and 47b for circulating the cooling medium are provided respectively in the two lines branched from the cooling-medium return line 42. The two lines in which the cooling medium having been cooled in the main heat exchangers 51a and 51b flows join at an outlet side of the main heat exchangers 51a and 51b and the joined line is connected to the cooling-medium supply line 41. In this manner, by providing a plurality of the main heat exchangers 51a and 51b, the cooling effect can be enhanced. Further, the number of the main heat exchangers may be determined by a total amount of heat generation from the heat-generating sources which are subjects of cooling.

Figure 10:
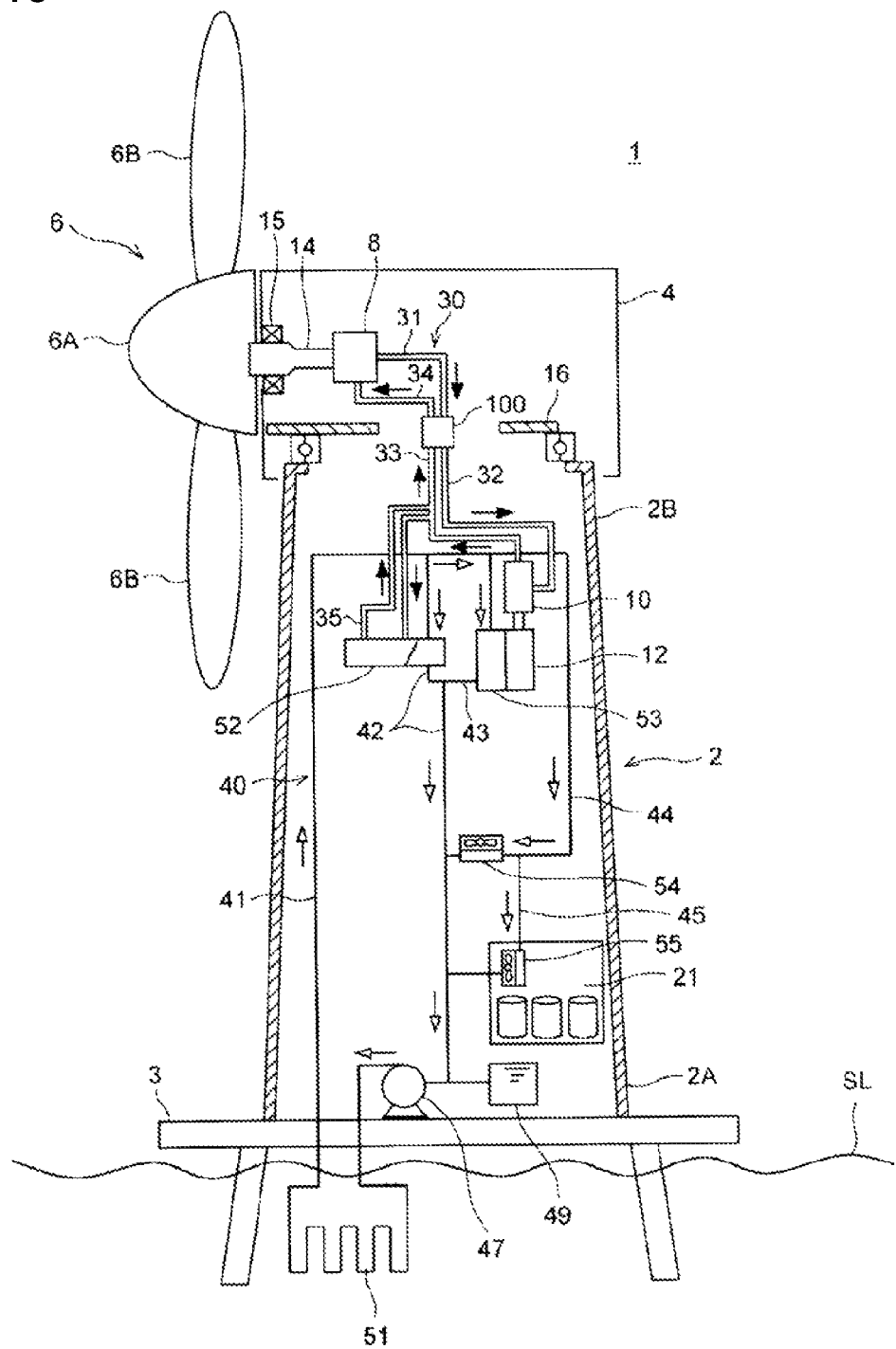
FIG. 10 is a general view showing a third modified example of the wind turbine generator of FIG. 1.

A third modified example is shown in FIG. 10. In the third modified, a cooling-medium tank 49 connected to the cooling-medium line 40 is arranged inside the tower 2 and the cooling-medium tank 49 is sealed off from a space inside the tower 2. In this manner, by arranging the cooling-medium tank 49 inside the tower 2 and sealing the cooling-medium tank 49 from the space inside the tower 2, the position where the cooling-medium tank 49 is arranged is no longer restricted. For instance, the cooling-medium tank 49 may be arranged in a lower part of the cooling-medium line. FIG. 10 shows one cooling-medium tank 49. However, this is not limitative and a plurality of the cooling-medium tanks 49 may be provided, or a combination of the cooling-medium tank 49 and the cooling medium tank 48 of open-type as shown in FIG. 1 may be provided.

Second Embodiment

Figure 11:
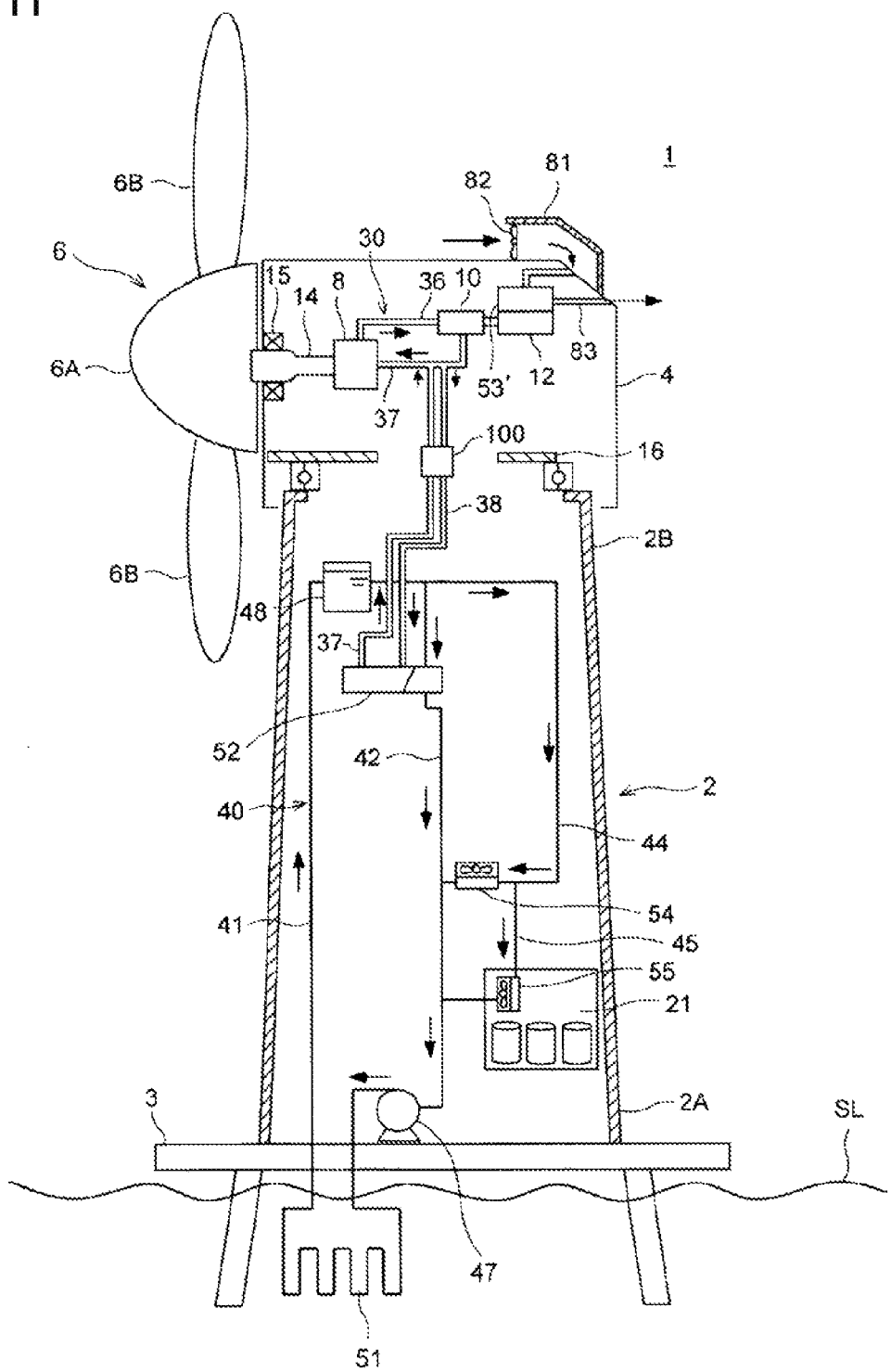
FIG. 11 shows a general structure of a wind turbine generator in relation to a second embodiment of the present invention.

A second preferred embodiment is explained in reference to FIG. 11. FIG. 11 shows a general structure of a wind turbine generator in relation to the second embodiment of the present invention. The wind turbine generator 1 of the second embodiment is substantially the same as that of the first embodiment, except for configurations of the hydraulic transmission and the operating-oil line 30. Thus, mainly the configurations different from the first embodiment are explained and the components already described in the first embodiment are indicated by the same reference numbers in FIG. 11 and are not explained further. In FIG. 11, the nacelle swivel mechanism 19 and the yaw driving mechanism 13 are not shown.

In the wind turbine generator 1 of the second embodiment, the hydraulic motor 10 and the generator 12 are supported on the nacelle side and the intermediate heat exchanger 52 is supported on the tower side.

The operating-oil line 30 includes an operating-oil circulation line through which the operating oil circulates between the hydraulic pump 8 and the hydraulic motor 10, and an operating-oil branch line 38 which is connected to the operating-oil circulation line in parallel.

The operating-oil circulation line includes a high-pressure oil line (HP oil line) 36 which connects an operating-oil outlet side of the hydraulic pump 8 and an operating-oil inlet side of the hydraulic motor 10, and a low-pressure oil line (LP oil line) 37 which connects an operating-oil outlet side of the hydraulic motor 10 and an operating-oil inlet side of the hydraulic pump 8.

The operating-oil branch line 38 branches from the LP oil line 37 and extends from the nacelle side to the tower side via the connection part having the swivel structure to be connected to the inlet side of the intermediate heat exchanger 52 on the tower side. Further, the operating-oil branch line 38 connected to the outlet side of the intermediate heat exchanger 52 extends from the tower side to the nacelle side via the connection part 100 to join the LP oil line 37. The connection part 100 may have the same configuration as the first embodiment.

A part of the low pressure oil branched from the LP oil line 37 is fed through the operating-oil branch line 38 to the intermediate heat exchanger 52 to cool the part of the low pressure oil by heat exchange with the cooling-medium, and then is returned to the LP oil line 37 through the operating-oil branch line 38.

In this manner, by supporting the hydraulic motor 8 on the nacelle side and connecting the operating-oil branch line 38 branching from the LP oil line 37 to the intermediate heat exchanger 52 on the tower side, the operating-oil line 30 where the flow amount of the operating oil is large can be shorter while reducing the flow amount of the operating oil passing through the connection part 100. By this, the piping structure can be simplified. Further, the operating-oil branch line 38 branches from the LP oil line 37 and thus, the operating-oil branch line 38 and the connection part 100 can be formed by a piping of low pressure-resistance, resulting in cost reduction.

The wind turbine generator of the second embodiment may also include a generator cooler 53' to cool the generator 12 by air.

In such case, a duct 81 is provided on the outer periphery of the nacelle 4 to draw in the ambient air. The duct 81 has an air inlet and is formed integrally on a wall surface of the nacelle 4. To promote letting in the ambient air, the duct 81 may have a fan 82 inside.

The ambient air drawn in by the duct 81 is led to the inside of the nacelle 4 via an air piping 83. In the air piping 83, a generator cooler 53' is provided. The generator cooler 53' may be configured, for instance, as a cooling jacket formed around the generator 12 to cool the generator 12 by streaming in the outer periphery of the cooling jacket the air drawn in by the duct 81. The air after cooling the generator 12 is discharged outside the nacelle through the air piping 83.

The ambient air drawn in by the duct 81 may be used to cool other heat-generating sources inside the nacelle 4. For instance, the ambient air may be used to cool the nacelle cooler (not shown) which cools the air inside the nacelle. In this manner, mainly the cool water is used to cool the heat-generating sources inside the tower 2 and the air is used to cool the heat-generating source inside the nacelle 4. As a result, the heat-generating sources of the wind turbine generator 1 can be cooled efficiently.

Third Embodiment

Figure 12:
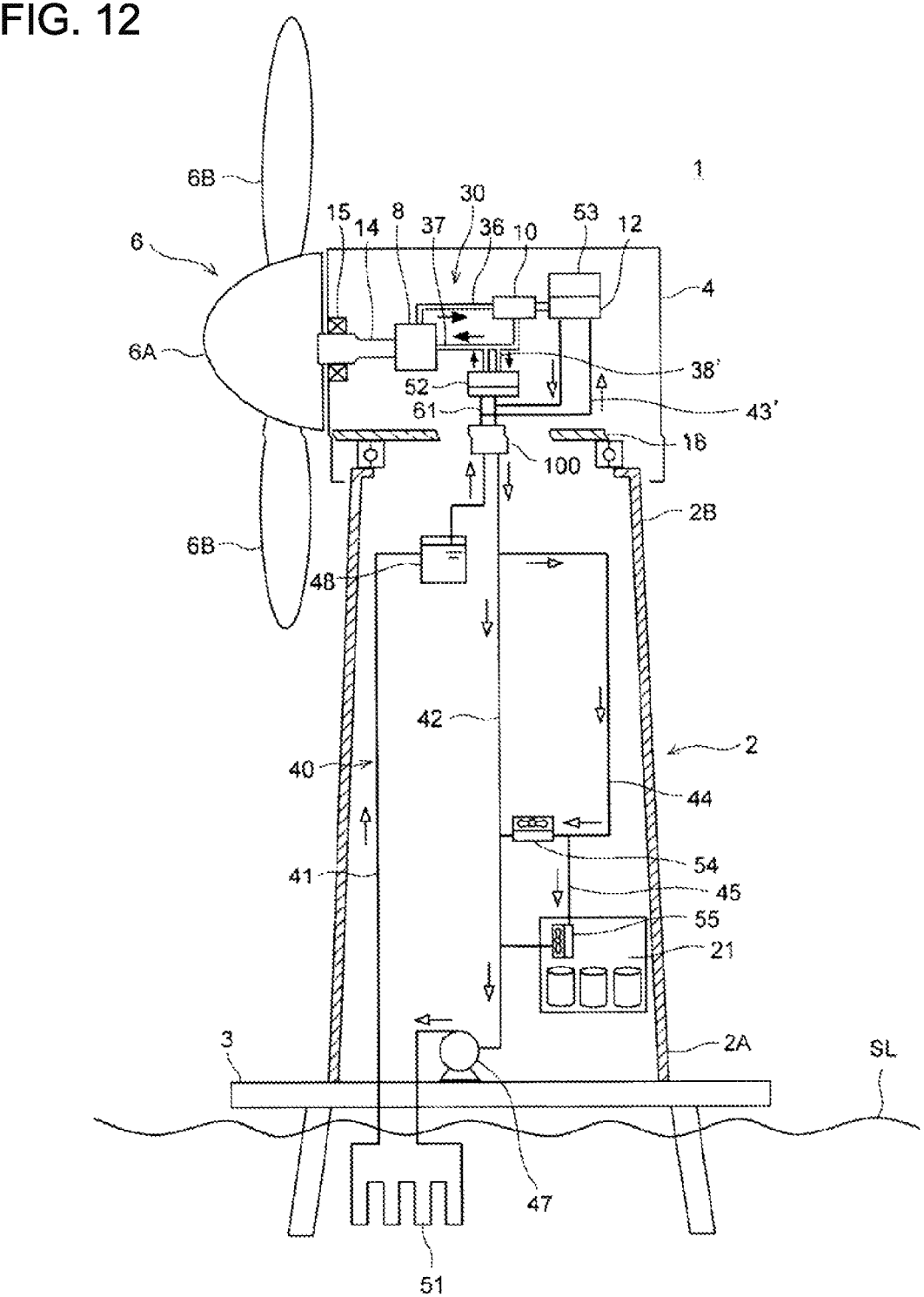
FIG. 12 shows a general structure of a wind turbine generator in relation to a third embodiment of the present invention.

A third preferred embodiment is explained in reference to FIG. 12. FIG. 12 shows a general structure of a wind turbine generator in relation to the third embodiment of the present invention.

The wind turbine generator 1 of the third embodiment is substantially the same as that of the first embodiment, except for configurations of the hydraulic transmission and the operating-oil line 30. Thus, mainly the configurations different from the first embodiment are explained and the components already described in the first embodiment are indicated by the same reference numbers in FIG. 12 and are not explained further. In FIG. 12, the nacelle swivel mechanism 19 and the yaw driving mechanism 13 are not shown.

In the wind turbine generator 1 of the third embodiment, the hydraulic motor 10 and the generator 12 are arranged in the nacelle 4 and the intermediate heat exchanger 52 is arranged in the nacelle 4 as well.

The operating-oil line 30 includes an operating-oil circulation line through which the operating oil circulates between the hydraulic pump 8 and the hydraulic motor 10, and an operating-oil branch line 38' which is connected to the operating-oil circulation line in parallel. Both of the operating-oil circulation line and the operating-oil branch line 38' are arranged in the nacelle 4.

The operating-oil circulation line includes a high-pressure oil line (HP oil line) 36 which connects the operating-oil outlet side of the hydraulic pump 8 and the operating-oil inlet side of the hydraulic motor 10, and a low-pressure oil line (LP oil line) 37 which connects the operating-oil outlet side of the hydraulic motor 10 and the operating-oil inlet side of the hydraulic pump 8.

The operating-oil branch line 38' branches from the LP oil line 37 and is connected to the inlet side of the intermediate heat exchanger 52 arranged in the nacelle 4. Further, the operating-oil branch line 38' connected to the outlet side of the intermediate heat exchanger 52 joins the LP oil line 37.

The cooling-medium line 40 includes a cooling-medium supply line 41 which is provided between the main heat exchanger 51 and the intermediate heat exchanger 52 via the connection part 100 having the swivel structure, and a cooling-medium return line 42 which is provided between the intermediate heat exchanger 52 and the main heat exchanger 51 via the connection part 100 in the same manner. Further, the connection part 100 may have the same configuration as the first embodiment.

The cooling medium having been cooled by the sea water in the main heat exchanger 51 is supplied to the intermediate heat exchanger 52 through the cooling-medium supply line 41 and cools the operating oil by heat exchange in the intermediate heat exchanger 52 and then returns to the main heat exchanger 51 through the cooling-medium return line 42.

In this manner the hydraulic motor 8 and the generator 10 are arranged in the nacelle 4 and the cooling-medium line 40 is connected via the connection part 100 to the intermediate heat exchanger 52 supported on the nacelle side and thus, the connection part 100 can be formed by a piping of low pressure-resistance, resulting in cost reduction.

Further, the cooling-medium line 40 may include a cooling-medium branch line 43' which branches from a nacelle side of the cooling-medium supply line 41 and joins a nacelle side of the cooling-medium return line 42. In the cooling-medium branch line 43', the generator cooler 53 may be provided to cool the generator 12. The generator cooler 53 may be configured, for instance, as a cooling jacket formed around the generator 12. In the generator cooler 53, the generator 12 is cooled by heat exchange with the cooling medium supplied from the cooling-medium branch line 43'.

Fourth Embodiment

Figure 13:
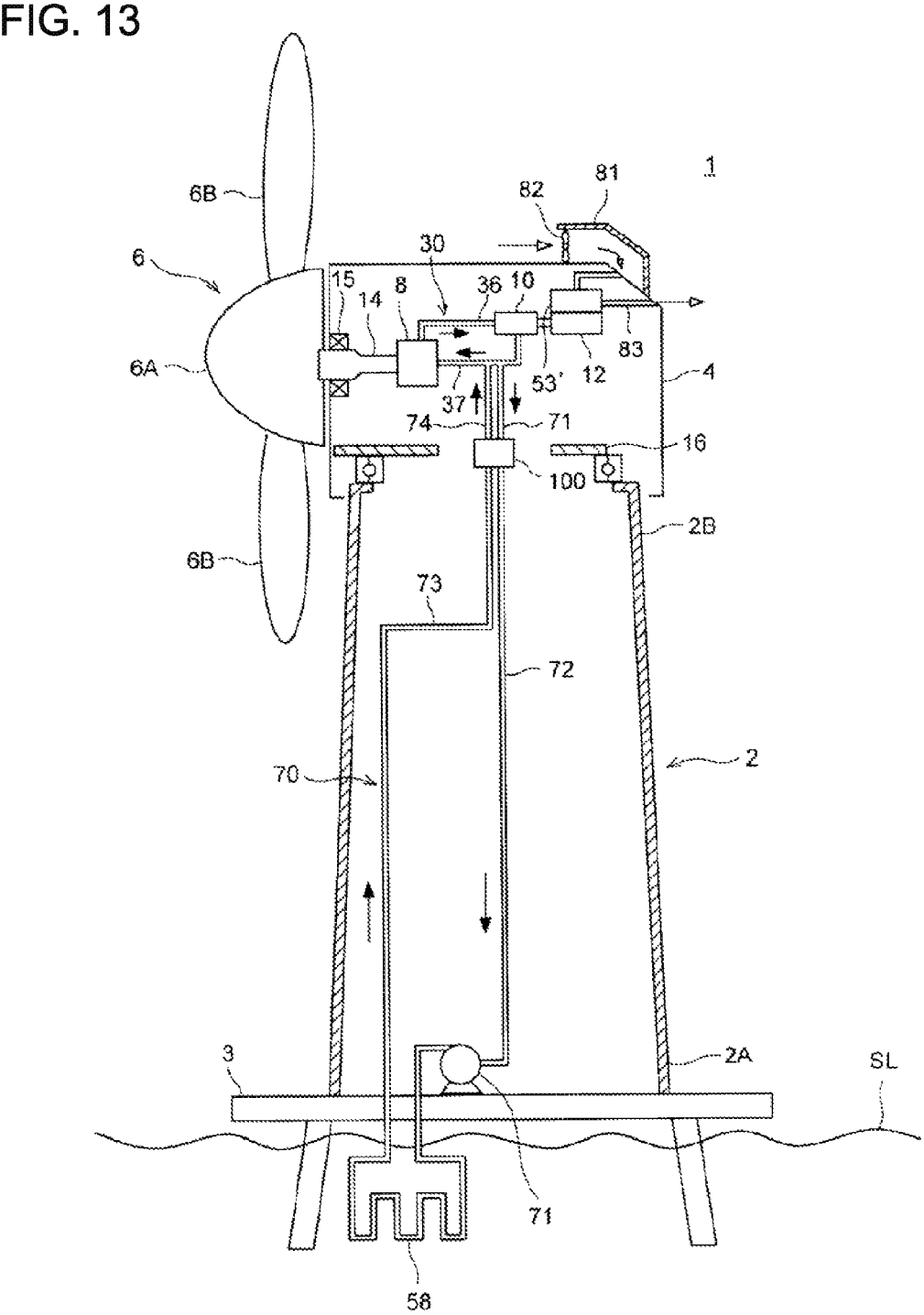
FIG. 13 shows a general structure of a wind turbine generator in relation to a fourth embodiment of the present invention.

A fourth preferred embodiment is explained in reference to FIG. 4. FIG. 13 shows a general structure of a wind turbine generator in relation to the fourth embodiment of the present invention.

The wind turbine generator 1 of the forth embodiment is not provided with the cooling-medium line 40 and the operating oil of the hydraulic transmission is cooled directly by the sea water. Further, the wind turbine generator 1 of the fourth embodiment is substantially the same as that of the first embodiment, except for configurations of the hydraulic transmission, the operating-oil line 30 and the cooling-medium line 40. Thus, mainly the configurations different from the first embodiment are explained and the components already described in the first embodiment are indicated by the same reference numbers in FIG. 13 and are not explained further. In FIG. 13, the nacelle swivel mechanism 19 and the yaw driving mechanism 13 are not shown.

In the wind turbine generator 1 of the fourth embodiment, the hydraulic motor 10 and the generator 12 are arranged in the nacelle 4.

The operating-oil line 30 includes an operating-oil circulation line through which the operating oil circulates between the hydraulic pump 8 and the hydraulic motor 10, and an operating-oil branch line 70 which is connected to the operating-oil circulation line in parallel. Both of the operating-oil circulation line and the operating-oil branch line 70 are arranged in the nacelle 4.

The operating-oil circulation line includes a HP oil line 36 which connects the operating-oil outlet side of the hydraulic pump 8 and the operating-oil inlet side of the hydraulic motor 10, and a LP oil line 37 which connects the operating-oil outlet side of the hydraulic motor 10 and the operating-oil inlet side of the hydraulic pump 8.

The operating-oil branch line 70 includes the first piping 71, 74 supported on the nacelle side and a second piping 72, 73 supported on the tower side. The operating-oil branch line 70 is preferably arranged in parallel to the LP oil line 37. In the operating-oil branch line 70, a pump is provided to stream the operating oil in the operating-oil branch line 70.

The first piping 71 and the second piping 72 are connected relatively rotatable by means of the connection part 100 having the swivel structure. In the same manner, the first piping 73 and the second piping 74 are connected relatively rotatable by means of the connection part 100. The connection part 100 has the same configuration as the first embodiment. The connection part 100 may have the same configuration as the first embodiment.

The operating oil which branched from the LP oil line 37 is introduced through the first piping 71, the connection part 100 and the second piping 72 to the main heat exchanger 58 in this order. In the main heat exchanger 58, the cooling medium is cooled by heat exchange with the sea water. The cooling medium discharged from the main heat exchanger 58 is returned through the second piping 73, the connection part 100 and the first piping 74 to the LP oil line 37 in this order.

According to the fourth embodiment, the operating oil is cooled by heat exchange with cool water source which is one of sea water, lake water, river water and groundwater around the base portion of the tower. Therefore, the operating oil can be cooled by the cool water source with higher efficiency than by air-cooling.

Further, one of the operating-oil circulation line and the operating-oil branch line 70 is divided into the first piping 71, 74 supported on the nacelle side and the second piping 72, 73 supported on the tower side and the first piping 71, 74 and the second piping 72, 73 are arranged relatively rotatable with each other by means of the connection part 100, 100', 100" having the swivel structure. Therefore, even when the nacelle 4 turns, the fluid can communicate smoothly between the first piping 71, 74 on the nacelle side and the second piping 72, 73 on the tower side.

The wind turbine generator 1 of the fourth embodiment may also include the generator cooler 53' to cool the generator 12 by air.

In such case, the duct 81 is provided on the outer periphery of the nacelle 4 to draw in the ambient air. The ambient air drawn in by the duct 81 is led to the inside of the nacelle 4 via the air piping 83. In the air piping 83, the generator cooler 53' is provided. The generator cooler 53' may be configured, for instance, as a cooling jacket formed around the generator 12 to cool the generator 12 by streaming in the outer periphery of the cooling jacket the ambient air drawn in by the duct 81. The air after cooling the generator 12 is discharged outside the nacelle through the air piping 83.

The ambient air drawn in by the duct 81 may be used to cool other heat-generating sources inside the nacelle 4. For instance, the ambient air may be used to cool the nacelle cooler (not shown) which cools the air inside the nacelle 4. In this manner, mainly the cool water is used to cool the heat-generating sources inside the tower 2 and the air is used to cool the heat-generating source inside the nacelle 4. As a result, the heat-generating sources of the wind turbine generator 1 can be cooled efficiently.

While the present invention has been described with reference to exemplary embodiments, it is obvious to those skilled in the art that various changes may be made without departing from the scope of the invention.

In the above embodiments, the wind turbine generator 1 is described as a specific example of the power generating apparatus of renewable energy type. However, the present invention is not limited to this and is also applicable to other types of power generating apparatuses of renewable energy type.

For instance, the present invention may be applied to a power generating apparatus which uses one of tidal current, ocean current and river current to generate power and the tower of which extends upward in the vertical direction from the base portion to the tip portion in or under the sea and the main shaft of which rotates upon receiving one of tidal current, ocean current and river current on the blade.

REFERENCE SIGNS LIST

1 WIND TURBINE GENERATOR
2 TOWER
2A BASE PORTION
2B TIP PORTION
4 NACELLE
6 ROTOR
6A HUB
6B BLADE

8 HYDRAULIC PUMP
10 HYDRAULIC MOTOR
12 GENERATOR
14 MAIN SHAFT
15 MAIN SHAFT BEARING
21 TRANSFORMER HOUSING
30 OPERATING-OIL LINE
31 FIRST HP PIPING
32 SECOND HP PIPING
33 SECOND LP PIPING
34 FIRST LP PIPING
36 HP OIL LINE
37 LP OIL LINE
38 OPERATING-OIL BRANCH LINE
40 COOLING-MEDIUM LINE
41 COOLING-MEDIUM SUPPLY LINE
42 COOLING-MEDIUM RETURN LINE
43, 44, 44', 45' COOLING-MEDIUM BRANCH LINE
51, 51', 58 MAIN HEAT EXCHANGER
52 INTERMEDIATE HEAT EXCHANGER
53 GENERATOR COOLER
54 TOWER COOLER
55 TRANSFORMER HOUSING COOLER
70 OPERATING-OIL BRANCH LINE
71, 74 FIRST PIPING
72, 73 SECOND PIPING
100, 100', 100" CONNECTION PART

The invention claimed is:
1. A power generating apparatus of renewable energy type which generates power from renewable energy, comprising:
a tower;
a nacelle which is supported rotatably by a tip portion of the tower;
a main shaft which is housed in the nacelle and rotates with a blade;
a hydraulic pump which is housed in the nacelle and is driven by rotation of the main shaft;
a hydraulic motor which is driven by operating oil supplied from the hydraulic pump;
a generator which is coupled to the hydraulic motor;
an operating-oil line which is provided between the hydraulic pump and the hydraulic motor and through which the operating oil circulates;
a cooling-medium line through which cooling medium for cooling the operating oil circulates via an intermediate heat exchanger; and
a main heat exchanger which cools the cooling medium by heat exchange with cool water source which is at least one of sea water, lake water, river water or groundwater around a base portion of the tower,
wherein at least one of the operating-oil line or the cooling-medium line comprises:
a first piping which is supported on a nacelle side;
a second piping which is supported on a tower side; and
a connection part which connects the first piping and the second piping so that the first piping and the second piping are relatively rotatable.
2. The power generating apparatus of renewable energy type according to claim 1,
wherein the hydraulic motor is provided between the tip portion and the base portion of the tower,
wherein the operating-oil line extends between the hydraulic pump arranged in the nacelle and the hydraulic motor arranged in the tower,
wherein the operating-oil line comprises the first piping, the second piping and the connection part, and
wherein the first piping is connected to the hydraulic pump and the second piping is connected to the hydraulic motor.
3. The power generating apparatus of the renewable energy type according to claim 1,
wherein the hydraulic motor is supported on the nacelle side and the intermediate heat exchanger is supported on the tower side,
wherein the operating-oil line includes an operating-oil circulation line through which the operating oil circulates between the hydraulic pump and the hydraulic motor, and an operating-oil branch line which branches from a low-pressure side of the operating-oil circulation line and through which the operating line returns to the operating-oil circulation line via the intermediate heat exchanger,
wherein the operating-oil branch line comprises the first piping, the second piping and the connection part, and
wherein the first piping is connected to the operating-oil circulation line and the second piping is connected to the intermediate heat exchanger.
4. The power generating apparatus of renewable energy type according to claim 1,
wherein the hydraulic motor and the generator are arranged in the nacelle and the intermediate cooler is supported on the nacelle side,
wherein the cooling-medium line comprises the first piping, the second piping and the connection part, and
wherein the first piping is connected to an intermediate heat exchanger side and the second piping is connected to a main heat exchanger side.
5. The power generating apparatus of renewable energy type according to claim 1, comprising:
at least one first flow path in which fluid flows from the nacelle side to the tower side;
at least one second flow path in which fluid flows from the tower side to the nacelle side;
a tubular member in which the at least one first flow and the at least one second flow path are formed;
a first jacket which is provided around the tubular member and which includes a circular flow path which communicates with the first piping through a first communication opening; and
a second jacket which is provided around the tubular member and which includes a circular flow path which communicates with the second piping through a second communication opening,
wherein the first jacket and the second jacket are fixed to the tubular member via a bearing to be freely rotatable relative to the tubular member.
6. The power generating apparatus of renewable energy type according to claim 5,
wherein, the tubular member has a cable-housing piping on an inner side of the first and second flow paths, the cable-housing piping housing a cable extending from the nacelle side to the tower side.
7. The power generating apparatus of renewable energy type according to claim 1, further comprising:
a water supply source which supplies water to the cooling-medium line; and
a pump which circulates cooling-medium in the cooling-medium line, the cooling-medium being formed by adding antifreeze to the water.
8. The power generating apparatus of renewable energy type according to claim 7,
wherein the water supply source is a cooling-medium tank which stores the cooling medium, and wherein the cooling-medium tank is arranged in an upper part of the tower and opens to a space inside the tower.

9. The power generating apparatus of renewable energy type according to claim 7,
wherein the water supply source is a cooling-medium tank which stores the cooling medium, and
wherein the cooling-medium tank is arranged in an upper part of the tower and is sealed off from a space inside the tower.

10. The power generating apparatus of renewable energy type according to claim 1, further comprising:
a casing which houses the main heat exchanger and has an inlet for the cool water source; and
a filter which is provided at the inlet for the cool water source of the casing to prevent foreign objects contained in the cool water source from entering the casing.

11. The power generating apparatus of renewable energy type according to claim 1,
wherein the main heat exchanger is arranged on a base on which the tower is installed.

12. The power generating apparatus of renewable energy type according to claim 11, further comprising:
a flow-rate regulating structure which is provided around a heat exchanger tube of the main heat exchanger to regulate a flow rate of the cool water source,
wherein a distance between the flow-rate regulating structure and the heat exchanger tube has an upper limit which is set based on a distance at which a set heat transfer coefficient is achieved in the heat exchanger tube, and a lower limit which is set based on a distance at which foreign objects adhered to the heat exchanger tube is detached.

13. The power generating apparatus of renewable energy type according to claim 11, further comprising:
a spray nozzle which sprays the cool water source to a surface of a heat exchanger tube of the main heat exchanger.

14. The power generating apparatus of renewable energy type according to claim 11,
wherein the main heat exchanger or the intermediate heat exchanger is a multitube heat exchanger having a plurality of heat exchanger tubes.

15. The power generating apparatus of renewable energy type according to claim 1,
wherein the power generating apparatus of renewable energy type is a wind turbine generator,
wherein the tower extends upward in a vertical direction from the base portion toward the tip portion, and
wherein the main shaft rotates upon receiving wind on the blade.

16. The power generating apparatus of renewable energy type according to claim 1, further comprising:
a generator cooler which is housed in the nacelle and which cools the generator by air drawn in from a periphery of the nacelle.

17. A power generating apparatus of renewable energy type which generates power from renewable energy, comprising:
a tower;
a nacelle which is supported rotatably at a tip portion of the tower;
a main shaft which is housed in the nacelle and rotates with a blade;
a hydraulic pump which is housed in the nacelle and is driven by rotation of the main shaft;
a hydraulic motor which is housed in the nacelle and which is driven by operating oil supplied from the hydraulic pump;
a generator which is coupled to the hydraulic motor;
an operating-oil circulation line which is provided inside the nacelle and between the hydraulic pump and the hydraulic motor, and through which the operating oil circulates;
an operating-oil branch line which branches from the operating-oil circulation line and extends between a base portion of the tower and the inside of the nacelle; and
a main heat exchanger which cools the operating oil by heat exchange with cool water source which is at least one of sea water, lake water, river water or groundwater around a base portion of the tower;
wherein the operating-oil branch line comprises:
a first piping which is supported on a nacelle side;
a second piping which is supported on a tower side; and
a connection part which connects the first piping and the second piping so that the first piping and the second piping are relatively rotatable.

18. A power generating apparatus of renewable energy type which generates power from renewable energy, comprising:
a tower;
a nacelle which is supported rotatably at a tip portion of the tower;
a main shaft which is housed in the nacelle and rotates with a blade;
a hydraulic pump which is housed in the nacelle and is driven by rotation of the main shaft;
a hydraulic motor which is driven by operating oil supplied from the hydraulic pump;
a generator which is coupled to the hydraulic motor;
an operating-oil circulation line which is provided between the hydraulic pump and the hydraulic motor and through which the operating oil circulates; and
a main heat exchanger which cools the operating oil by heat exchange with a cool water source which is at least one of sea water, lake water, river water or groundwater around a base portion of the tower; and
an operating-oil branch line which branches from the operating-oil circulation line,
wherein at least one of the operating oil circulation line or the operating-oil branch line comprises:
a first piping which is supported on a nacelle side;
a second piping which is supported on a tower side; and
a connection part which connects the first piping and the second piping so that the first piping and the second piping are relatively rotatable, and
wherein the power generating apparatus of renewable energy type further comprises a generator cooler which is housed in the nacelle and which cools the generator by air drawn in from a periphery of the nacelle.

* * * * *